(12) United States Patent
Stoner et al.

(10) Patent No.: US 8,276,829 B2
(45) Date of Patent: Oct. 2, 2012

(54) BUILDING CONTROL SYSTEM WITH REMOTE CONTROL UNIT AND METHODS OF OPERATION

(75) Inventors: Marcus D. Stoner, Minnetonka, MN (US); Robert J. Schnell, Plymouth, MN (US); David A. Schultz, Savage, MN (US); Cary Leen, Hammond, WI (US)

(73) Assignee: Honeywell International Inc., Morristown, NJ (US)

(*) Notice: Subject to any disclaimer, the term of this patent is extended or adjusted under 35 U.S.C. 154(b) by 1196 days.

(21) Appl. No.: 11/948,971

(22) Filed: Nov. 30, 2007

(65) Prior Publication Data

US 2009/0140060 A1 Jun. 4, 2009

(51) Int. Cl.
*G05D 23/00* (2006.01)

(52) U.S. Cl. .................. 236/1 C; 236/51; 165/209

(58) Field of Classification Search .................. 165/209; 236/51, 1 C
See application file for complete search history.

(56) References Cited

U.S. PATENT DOCUMENTS

| | | | | |
|---|---|---|---|---|
| 4,308,911 A | * | 1/1982 | Mandl | 165/209 |
| 4,336,902 A | | 6/1982 | Neal | |
| 4,433,719 A | | 2/1984 | Cherry et al. | |
| 4,585,164 A | | 4/1986 | Butkovich et al. | |
| 4,969,508 A | * | 11/1990 | Tate et al. | 165/209 |
| 5,023,782 A | * | 6/1991 | Lutz et al. | 705/45 |
| 5,272,477 A | | 12/1993 | Tashima et al. | |
| 5,590,831 A | | 1/1997 | Manson et al. | |
| 5,603,451 A | | 2/1997 | Helander et al. | |
| 5,654,813 A | | 8/1997 | Whitworth | |
| 5,833,134 A | | 11/1998 | Ho et al. | |
| 5,839,654 A | | 11/1998 | Weber | |
| 6,116,512 A | * | 9/2000 | Dushane et al. | 236/51 |
| 6,152,375 A | | 11/2000 | Robison | |
| 6,196,467 B1 | | 3/2001 | Dushane et al. | |
| 6,260,765 B1 | | 7/2001 | Natale et al. | |
| 6,394,359 B1 | | 5/2002 | Morgan | |
| 6,460,774 B2 | | 10/2002 | Sumida et al. | |
| 6,513,723 B1 | * | 2/2003 | Mueller et al. | 236/46 R |
| 6,810,307 B1 | | 10/2004 | Addy | |
| 7,083,109 B2 | | 8/2006 | Pouchak | |
| 7,089,088 B2 | | 8/2006 | Terry et al. | |

(Continued)

OTHER PUBLICATIONS

OESA Heating Products, Wireless Hand-Held Remote Control Sets Models (C) GHRCB and (C)GHRCTB, Operating Instructions, 4 pages, May 2003.

(Continued)

*Primary Examiner* — Cheryl J Tyler
*Assistant Examiner* — Jonathan Bradford
(74) *Attorney, Agent, or Firm* — Seager Tufte & Wickhem LLC

(57) ABSTRACT

A building controller for controlling the comfort level in a building is described. The building controller may include a thermostat and wireless remote controller for communicating with the thermostat from a remote location. The thermostat may have access to a first temperature sensor for sensing a first temperature, sometimes at or near the thermostat. The remote controller may likewise have a second temperature sensor for sensing a second temperature, sometimes at or near the remote controller. Under some conditions, the thermostat may use the second temperature sensed by the remote controller to control the comfort level in a building unless or until a predetermined condition is detected, after which the thermostat may use a different temperature, such as the first temperature at or near the thermostat, to control the comfort level in a building.

24 Claims, 20 Drawing Sheets

U.S. PATENT DOCUMENTS

| | | |
|---|---|---|
| 7,108,194 B1 | 9/2006 | Hankins, II |
| 7,146,253 B2 | 12/2006 | Hoog et al. |
| 2002/0104323 A1* | 8/2002 | Rash et al. ............ 62/176.1 |
| 2002/0148410 A1* | 10/2002 | Thomas .................. 119/452 |
| 2003/0034897 A1 | 2/2003 | Shamoon et al. |
| 2003/0034898 A1 | 2/2003 | Shamoon et al. |
| 2003/0103075 A1 | 6/2003 | Rosselot |
| 2004/0193324 A1 | 9/2004 | Hoog et al. |
| 2005/0083168 A1 | 4/2005 | Breitenbach |
| 2005/0270151 A1 | 12/2005 | Winick |
| 2006/0071086 A1 | 4/2006 | Kates |
| 2006/0186213 A1 | 8/2006 | Carey et al. |
| 2007/0045429 A1* | 3/2007 | Chapman et al. ........... 236/46 C |
| 2007/0114293 A1 | 5/2007 | Gugenheim |
| 2007/0114295 A1 | 5/2007 | Jenkins |

OTHER PUBLICATIONS

TRANE, "Wireless Zone Sensor. Where Will Technology Take You?", 4 pages, Feb. 2006.

Travis Industries, Remote Fireplace Thermostat, Part #99300651, 6 pages, printed Feb. 3, 2003.

Logitech, "Harmony 880 Remote User Manual," v. 1, pp. 1-15, prior to Nov. 30, 2007.

Lux Products Corporation, "9000RF Remote Instructions," 2 pages, prior to Nov. 30, 2007.

OMRON Electronic Components, LLC, "Micro Tilt Sensor D6B," Cat. No. JB301-E3-01, 6 pages, Mar. 2005.

OMRON Electronic Components, LLC, "Micro Tilt Sensor D6B," Cat. No. B02WAD1, 2 pages, Jun. 2002.

Sharp Corporation, "GP1S036HEZ Phototransistor Output, Transmissive Photointerrupter with Tilt Direction (4-Direction) Detecting," pp. 1-11, Oct. 3, 2005.

Totaline, "P/N 374-0431 Thermostat Remote Control & Receiver," 11 pages, prior to Nov. 30, 2007.

Honeywell, "Excel Building Supervisor-Integrated R7044 and FS90 Ver. 2.0," Operator Manual, 70 pages, Apr. 1995.

Trane, "System Programming, Tracer Summit Version 14, BMTW-SVP01D-EN," 623 pages, 2002.

* cited by examiner

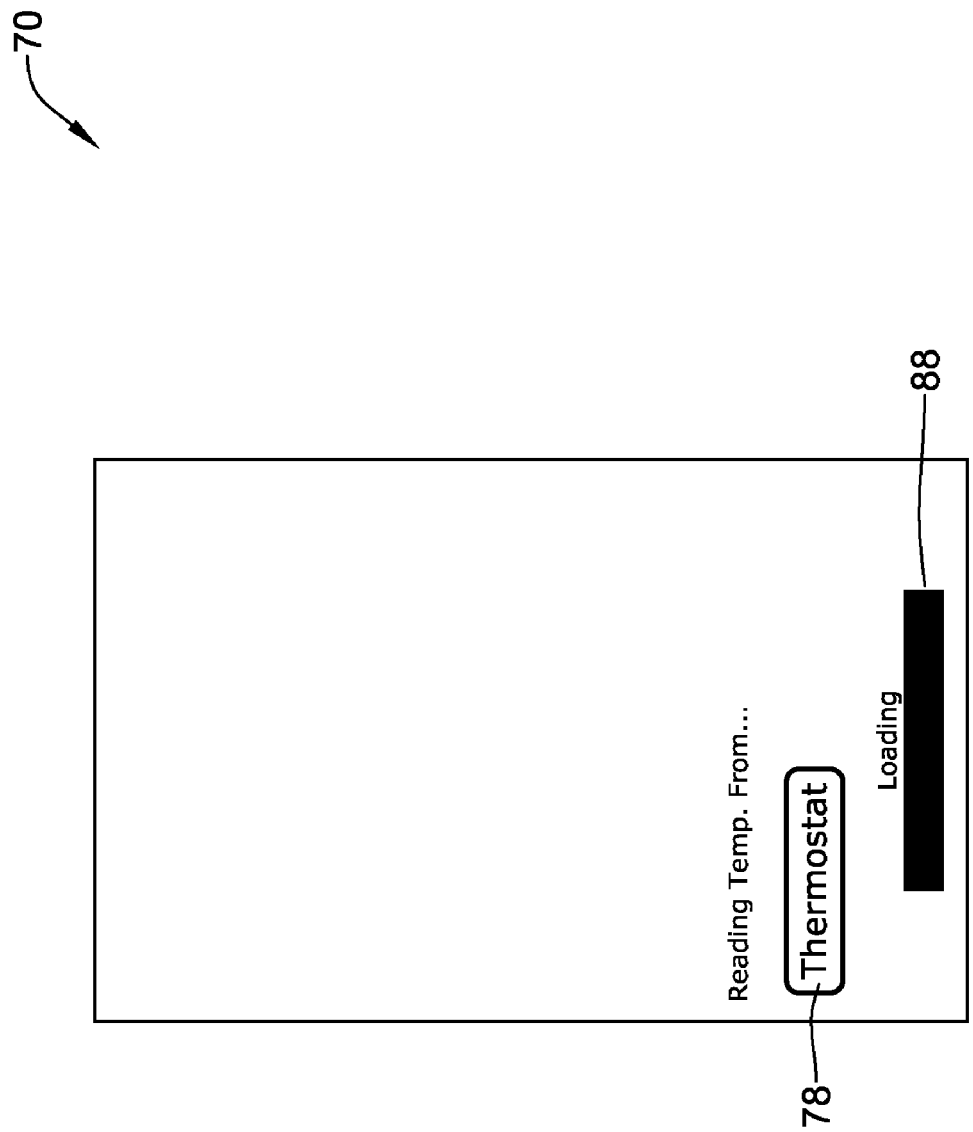

BUILDING CONTROL SYSTEM WITH REMOTE CONTROL UNIT AND METHODS OF OPERATION

FIELD

The present invention relates generally to building control systems that include an HVAC controller as well as a remote control unit, and more particularly, to devices and methods for remote control unit sensing and control in such building control systems.

BACKGROUND

Building control systems often include heating, ventilation, and/or air conditioning (HVAC) systems to control the comfort level within a building. Many building control systems include a controller that activates and deactivates one or more HVAC components of the HVAC system to affect and control one or more environmental conditions within the building. These environmental conditions can include, but are not limited to, temperature, humidity, and/or ventilation. In many cases, the controller of the building control system may include, or have access to, one or more sensors, and may use parameters provided by the one or more sensors to control the one or more HVAC components to achieve one or more programmed or set environmental conditions.

In some cases, the controller may be a thermostat that is mounted to a wall or the like of the building. A typical thermostat includes a local temperature sensor and/or other sensors, which may be used to sense one or more environmental conditions of the inside space proximate to the thermostat, and/or may have access to one or more remotely mounted sensors that are mounted to a wall or the like in the building at a location remote from the thermostat. In these installations, the sensors are typically mounted at or near the walls of the building, and at particular fixed locations within the building. In many cases, the occupants of the building do not occupy the space immediately adjacent to the sensors, and therefore, the environmental conditions sensed by the sensors often do not accurately represent the actual environmental conditions at the location of the occupants. In addition, to make a desired change to the environmental condition in the building, the occupant must often walk over and physically interact with the controller. In zoned systems, the occupant may have to walk to each zone and interact with the controller in each zone.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

The present invention relates generally to building control systems that include an HVAC controller as well as a remote control unit, and more particularly, to devices and methods for remote control unit sensing and control in such building control systems. In one illustrative embodiment, a comfort control system for controlling one or more HVAC components of a building or other structure may include a first controller and a second controller. The first controller, which may be a thermostat or the like, may have access to a first temperature sensor for sensing a first temperature. In some cases, the first temperature sensor may be local and sometimes in the same housing as the first controller. Alternatively, or in addition, the first temperature sensor may be remote from the first controller, but in communication therewith. The first controller may further include a wireless interface, and a control module for controlling the comfort level of at least a portion of the building or other structure by activating and deactivating one or more HVAC components of the building or other structure. The second controller may have a second temperature sensor for sensing a second temperature, and a wireless interface. The wireless interface of the second controller and the wireless interface of the first controller may be configured to provide a communication path, whereby the second temperature can be communicated from the second controller to the first controller.

In some cases, the control module of the first controller may be configured to control the comfort level of at least the portion of the building or other structure based at least primarily on the first temperature or the second temperature, and sometimes solely on either the first temperature or the second temperature. In some illustrative embodiments, when the control module of the first controller is controlling the comfort level of at least the portion of a building or other structure based at least primarily on the second temperature, the control module may automatically switch to controlling the comfort level based at least primarily on the first temperature when a predetermined condition is detected.

In some cases, the predetermined condition may include, for example, the first temperature and the second temperature deviating by more than a threshold amount, the expiration of a period of time, the second temperature exceeding a temperature limit, a rate of change of the first temperature and a rate of change of the second temperature deviating by more than a threshold amount, a rate of change of the second temperature exceeding a threshold limit, a direction of change of the first temperature and a direction of change of the second temperature being different, a detected response direction of the second temperature that is different from the expected response direction when the second temperature has an expected response direction when one or more HVAC components are activated by the control module, the response time of the first temperature and the response time of the second temperature deviating by more than a threshold amount when the first temperature and the second temperature each have a response time in response to activation of one or more HVAC components by the control module, the second temperature having temperature swings that exceed predefined limits, the cycling of the one or more HVAC components falling outside of desired parameters when the control module of the first controller cycles the one or more HVAC components when controlling the comfort level of at least the portion of the building or other structure, and/or any other suitable predetermined condition or combination of predetermined conditions.

In some embodiments, a building system controller may include a thermostat having a first temperature sensor for sensing a first temperature, a portable remote controller having a second temperature sensor for sensing a second temperature, and a wireless interface adapted to communicate the second temperature to the thermostat. The thermostat may have a control module that controls the comfort level of at least a portion of a building by activating and/or deactivating one or more HVAC components. In some cases, the control module may use the second temperature to control the comfort level, and if a condition is subsequently detected, the control module may use a different temperature than the second temperature. In some cases, the different temperature may be the first temperature, an arithmetic combination of the first temperature and the second temperature, an average of the first temperature and the second temperature, a weighted average of the first temperature and the second temperature, or any other suitable different temperature, as desired.

BRIEF DESCRIPTION

The invention may be more completely understood in consideration of the following detailed description of various illustrative embodiments of the invention in connection with the accompanying drawings, in which.

Figure 1:
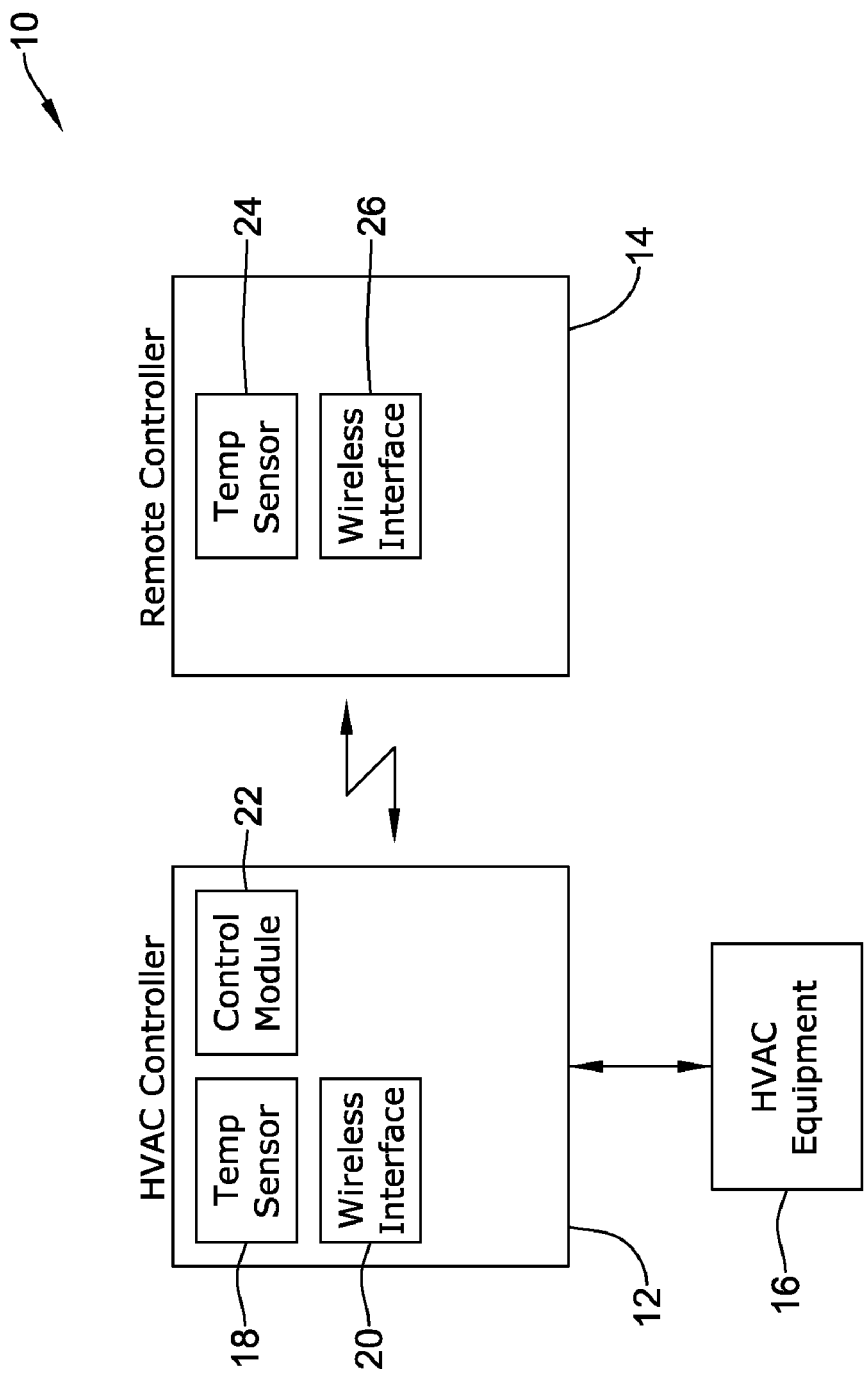
FIG. 1 is a block diagram of an illustrative embodiment of a building control system including a HVAC controller and a remote controller.

FIGS. 4A-D are a pictorial views showing an illustrative remote controller user interface having a temperature and temperature control indicator displayed on part of the display; and FIGS. 5-17 are flow diagrams of illustrative methods of controlling the comfort level of a building control system.

DETAILED DESCRIPTION

The following description should be read with reference to the drawings wherein like reference numerals indicate like elements throughout the several views. The detailed description and drawings show several embodiments which are meant to be illustrative of the claimed invention.

FIG. 1 is a block diagram of an illustrative embodiment of a building control system 10. In the illustrative embodiment, building control system 10 may include a heating, ventilation, and air conditioning (HVAC) controller 12, HVAC equipment 16 having one or more HVAC system components, and a remote controller 14. In the illustrative embodiment, HVAC controller 12 may be operatively connected in any suitable manner to HVAC equipment 16, such as one or more HVAC system components of HVAC equipment 16, which can be activated to regulate one or more environmental conditions such as temperature, humidity, ventilation, and air quality levels within a building or structure. Example HVAC equipment 16 may include, but are not limited to, cooling units (i.e. air conditioners), heating units (i.e. boilers, furnaces, etc.), filtration units, dampers, valves, sensors, humidifier/dehumidifier units, and ventilation units (i.e. fans, blowers, etc.). In some cases, HVAC controller 12 may be a thermostat, such as, for example, a wall mountable thermostat, if desired. However any suitable HVAC controller may be used, as desired.

In the illustrative embodiment, the HVAC controller 12 may include a control module 22, a temperature sensor 18, and a wireless interface 20. Temperature sensor 18 may sense the temperature proximate to the HVAC controller 12. As illustrated, temperature sensor 18 may be included with the HVAC controller 12, such as within the housing of HVAC controller 12. However, it is contemplated that temperature sensor 18 may be located remote from the HVAC controller 12, but in communication therewith.

Control module 22 of HVAC controller 12 may be configured to control the comfort level of at least a portion of the building or structure by activating and/or deactivating the one or more HVAC components of HVAC equipment 16. In some cases, control module 22 may be configured to control one or more HVAC functions, such as, for example, HVAC schedules, temperature setpoints, humidity setpoints, trend logs, timers, environment sensing, and/or other HVAC functions, as desired. In the illustrative embodiment, control module 22 may selectively control the comfort level of at least a portion of the building or structure using the temperature sensed by temperature sensor 18 or a temperature sensed by a temperature sensor 24 of the remote controller 14, as will be discussed in further detail below.

Wireless interface 20 of the HVAC controller 12 may be configured to wirelessly communicate (i.e. transmit and/or receive signals) with one or more HVAC components of HVAC equipment 16. Alternatively, or in addition, wireless interface 20 may be configured to communicate with wireless interface 26 of the remote controller 14. For example, wireless interface 20 may be configured to communicate with wireless interface 26 of the remote controller 14 to send and/or receive a signal corresponding to, for example, the temperature sensed by temperature sensor 24. The wireless interface 20 may include, for example, a radio frequency (RF) wireless interface, an infrared wireless interface, a microwave wireless interface, an optical interface, and/or any other suitable wireless interface, as desired. Wireless interface 20 may also be coupled to the control module 22 to provide information corresponding to the temperature sensed by, for example, temperature sensor 24.

In the illustrative embodiment, a remote controller 14 may be operatively connected to the HVAC controller 12 to provide remote temperature sensing for the building control system 10. In some cases, the remote controller 14 may be a portable remote control unit. The remote controller 14 may be, in some cases, simply a portable remote sensing module for sensing an environmental parameter and providing a measure related to the sensed environmental parameter to HVAC controller 12 via the wireless interfaces 26 and 20. In other cases, the remote controller 14 may be a more sophisticated device that includes a remote user interface (RUI) that allows a user to view, display and/or change one or more parameters of the HVAC controller 12 and/or remote controller 14.

In either case, the remote controller 14 may be movable between multiple locations within a building or structure by a user. For example, in a residential building, the remote controller 14 may be movable between a living room, a kitchen, a den, a bedroom, and/or any other location in the residential building. The remote controller 14 may sense an ambient temperature adjacent to the remote controller 14 and relay the temperature to the HVAC controller 12. The control module 22 may then use the temperature sensed by the remote controller 14 to control the comfort level. As indicated above, and in some cases, the remote controller 14 may provide a remote user interface (RUI) for viewing, displaying and/or changing one or more parameters of the HVAC controller 12.

As illustrated, remote controller 14 may include a temperature sensor 24 and a wireless interface 26. As briefly mentioned previously, temperature sensor 24 may be configured to sense the temperature of the environment in the vicinity of the remote controller 14. Wireless interface 26 may be configured to wirelessly communicate (i.e. transmit and/or receive signals) with the wireless interface 20 of the HVAC controller 12. In some cases, wireless interface 26 may transmit a signal corresponding to the temperature sensed by temperature sensor 24 to the HVAC controller 12.

Remote Controller 14 can provide for user interaction with the HVAC Controller 12 from locations remote from the HVAC Controller 12. Also, and as detailed above, the remote controller 14 may include a temperature sensor (and/or other type of sensors such as humidity), and may transmit a temperature (and/or other) sensor value to the HVAC Controller 12 for use in controlling the comfort level of at least a portion of the building or structure. During use, the remote controller 14 can be carried to various rooms or locations within a building or structure to control the comfort level using the temperature (and/or other parameter) sensed at the current location of the Remote Controller 14, instead of using the temperature (and/or other) sensed at the fixed location of the HVAC Controller 12.

For example, in the case of a residential building, the remote controller 14 may be moved from a living room to a kitchen, a bedroom, or other room. The remote controller 14 may initially sense the temperature of the living room and control the comfort level in the building (or zone of the building) using the sensed temperature from that location. When the remote controller 14 is moved to another room by the user, the remote controller 14 may sense the temperature of the new room. If the temperature sensed in the new room is different from the living room, the HVAC controller 12 may activate one or more HVAC components of HVAC Equipment 16 to heat or cool the new room to the desired setpoint temperature.

Because the remote controller 14 is portable, it can be placed at locations where the sensed temperature may not accurately reflect the ambient temperature of the room. For example, bright sunlight, an open window, an air draft caused by an open door or the like, a heat source, or other condition may cause the sensed temperature at the remote controller 14 to be inaccurate. In some instances, the remote controller 14 may be moved to a location outside the building or structure. In these and other situations, the HVAC system may operate using an inaccurate temperature reading, and may cause the HVAC system to consume excess energy and/or may cause at least a portion of the building or structure to have relatively extreme high or low temperatures.

In operation, and in one illustrative embodiment, control module 20 of the HVAC controller 12 may control the comfort level of at least the portion of the building or other structure using, for example, the temperature sensed by either the temperature sensor 18 of the HVAC controller 12 or the temperature sensor 24 of the remote controller 14. In some cases, when the control module 20 of the HVAC controller 12 is controlling the comfort level of at least the portion of a building or other structure using the temperature from temperature sensor 24 of the remote controller 14, the control module 20 may switch, in some cases, automatically switch, to controlling the comfort level using the temperature from temperature sensor 18 of the HVAC controller 12 when a condition is detected.

In other cases, the control module 22 may switch, in some cases automatically switch, from the temperature sensed by the temperature sensor 24 of the remote controller 14 to a different temperature, which may or may not be the temperature sensed by temperature sensor 18, if desired. For example, the different temperature may be the first temperature, an arithmetic combination of the first temperature and the second temperature, an average of the first temperature and the second temperature, a weighted average of the first temperature and the second temperature, or any other suitable temperature, as desired. In some cases, the condition may be or include one or more predetermined conditions, if desired.

Example conditions, which will be discussed in further detail below, may include, but are not limited to, the first temperature and the second temperature deviating by more than a threshold amount, the expiration of a period of time, the second temperature exceeding a temperature limit, a rate of change of the first temperature and a rate of change of the second temperature deviating by more than a threshold amount, a rate of change of the second temperature exceeding a threshold limit, a direction of change of the first temperature and a direction of change of the second temperature being different, and a programmed schedule time boundary being passed. In another example, the second temperature may have an expected response direction when one or more HVAC components are activated by the control module and the condition may include a detected response direction of the second temperature that is different from the expected response direction. In another example, the first temperature and the second temperature may each have a response time in response to activation of one or more HVAC components by the control module and the condition may include the response time of the first temperature and the response time of the second temperature deviating by more than a threshold amount. In another example, the control module of the first controller may cycle the one or more HVAC components when controlling the comfort level of at least the portion of the building or other structure and the condition may include cycling of the one or more HVAC components falling outside of desired parameters.

It should be recognized that HVAC controller 12 and remote controller 14 of FIG. 1 are merely illustrative and are not meant to be limiting in any manner. It is to be understood that the HVAC controller 12 and the remote controller 14 may be any suitable devices, as desired.

In some cases, it is contemplated that the HVAC controller 12 may include a user interface that may allow a user or technician to program and/or modify one or more control parameters of controller 12 of HVAC controller 12, such as programming and/or schedule parameters, if desired. In this case, the user interface may include a touch screen, a liquid crystal display (LCD) panel and keypad, a dot matrix display, a computer, buttons and/or any other suitable device, as desired. Likewise, remote controller 14 may include a user interface that may allow a user or technician to program and/or modify one or more control parameters of HVAC controller 12, such as programming and/or schedule parameters, if desired. In one illustrative embodiment, these parameters may be received via a user interface of remote controller 14, and then transmitted to the HVAC controller 12 via wireless interface 26 and wireless interfaced 20.

Figure 2:
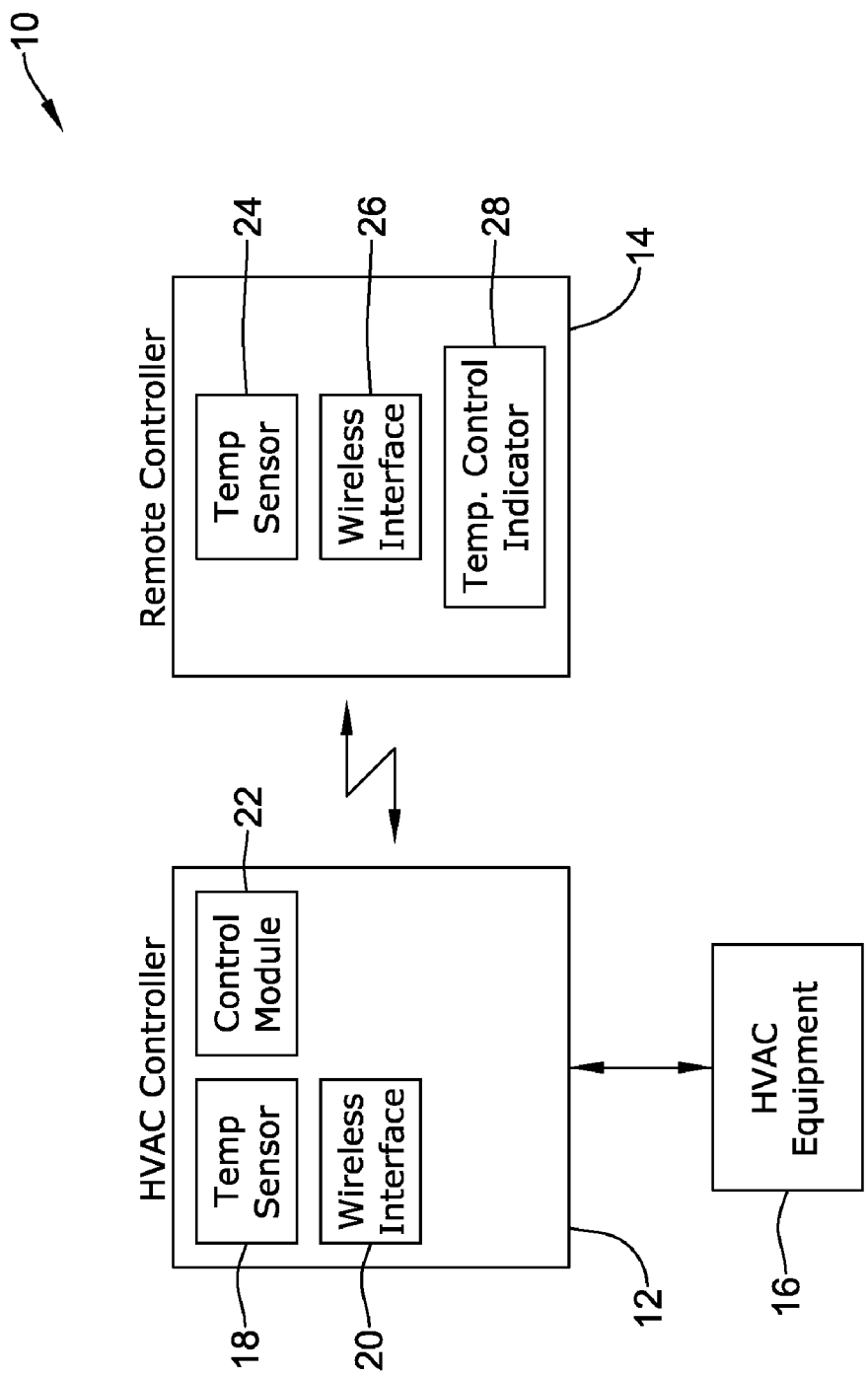
FIG. 2 is a block diaphragm of another illustrative embodiment of the building control system of FIG. 1 having a temperature control indicator.

FIG. 2 is a block diaphragm of similar illustrative embodiment of the building control system of FIG. 1 but further includes a temperature control indicator. In the illustrative embodiment of FIG. 2, the remote controller 14 includes a temperature control indicator 28. In some cases, the temperature control indicator 28 may indicate if the temperature from the remote controller 14 (i.e. temperature sensor 24) or the temperature from the HVAC controller 12 (i.e. temperature sensor 18) is currently being used (or at least primarily being used) to control the comfort level of the building or structure.

In one example, the temperature control indicator 28 may include a light-emitting diode (LED) that may be illuminated according to which device is currently controlling the comfort level of the building or structure. In some cases, the LED may be provided on the HVAC controller 12 (not explicitly shown) and/or the remote controller 14, and indicate when the HVAC controller 12 or the remote controller 14 is currently controlling the comfort level. In one example, if the HVAC controller 12 is controlling, the LED may emit a light, and when the remote controller 14 is controlling, the LED may emit no light (or different color, etc.), or vice versa. In another example, the temperature control indicator 28 may include text on a display indicating if the HVAC controller 12 or the remote controller 14 is currently used to control the comfort level. For example, when the temperature control indicator 28 is included in the remote controller 14, the text may read "Reading Temp from Remote" or "Reading Temp from Thermostat", or some other similar text or icon indicating if the temperature sensor of the remote controller 14 or the HVAC controller 12 is currently being used to control the comfort level.

In another example, the temperature control indicator 28 may include two boxes on a display; a first box for when the remote controller 14 is controlling and a second box for when the HVAC controller 12 is controlling. To indicate which is controlling, the corresponding box may be highlighted, outlined, colored, bolded, or otherwise indicated that the sensor(s) of the corresponding controller is currently being used to control the comfort level. One set of example boxes may include text, such as, "Thermostat", "Remote", "This Device", or any other text or icon as desired within or adjacent a corresponding box (e.g. see FIG. 4A).

In another example, the temperature control indicator 28 may include an audible alarm, siren, beep, or other audible indicator to indicate if the sensor(s) of the remote controller 14 or the HVAC controller 12 is controlling. In another example, the remote controller 14 may beep or provide some other audible signal when control is transferred to and/or from the HVAC controller 12, the HVAC controller 12 may beep or provide some other audible signal when control is transferred to and/or from the remote controller 14. When provided, it is contemplated that any combination of temperature control indicators may be provided in either the HVAC controller 12 or the remote controller 14, or both, as desired.

Figure 3:
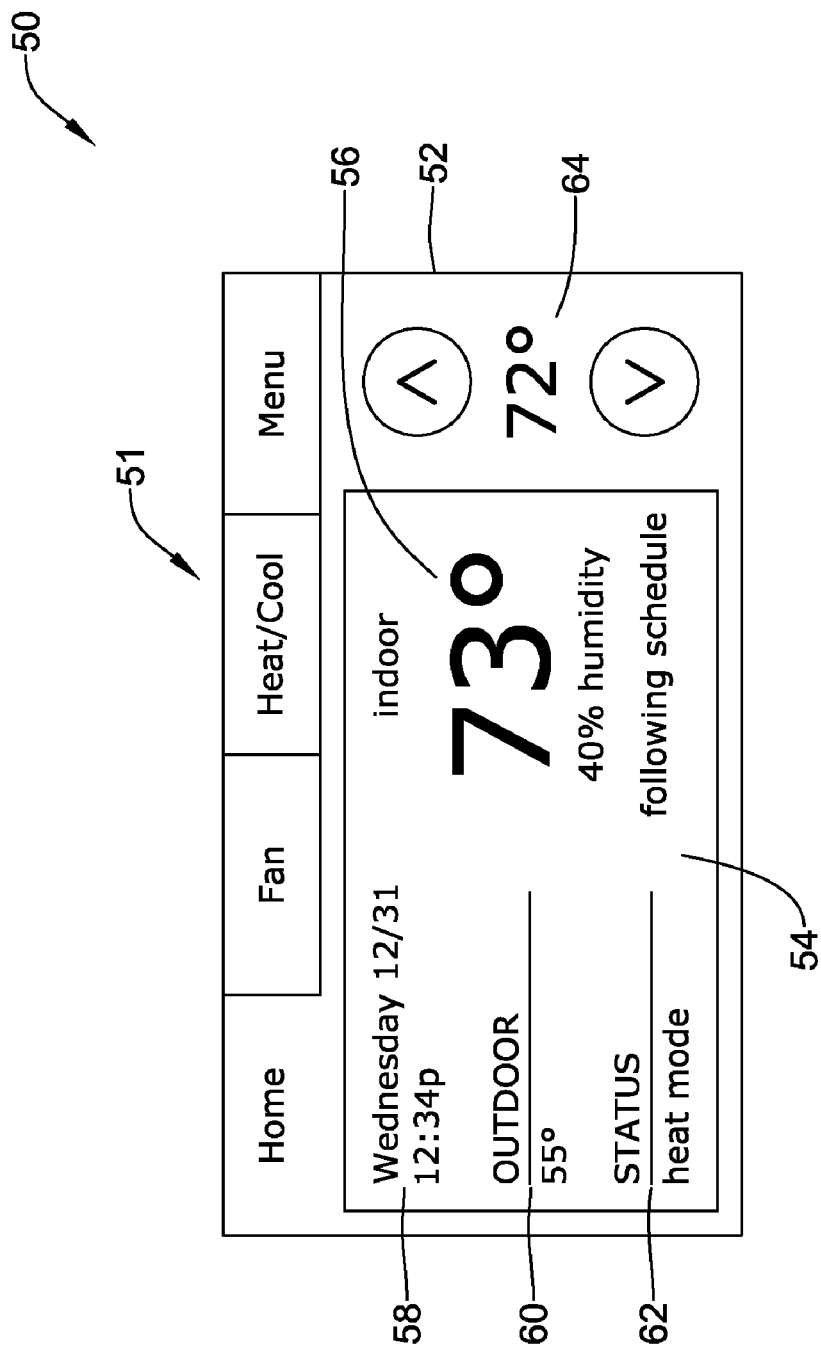
FIG. 3 is a pictorial view showing an illustrative HVAC controller user interface having a temperature displayed on a display.

FIG. 3 is a pictorial view showing an illustrative HVAC controller 12 user interface 50 having a temperature displayed on a display 52. In the illustrative embodiment, user interface 50 may include a display 52 configured to display information about one or more HVAC controller 12 parameters. In some cases, user interface 50 may include an LCD touch screen 54 display configured to display information and transmit signals to and from the control module 22 of the HVAC controller 12. Some examples of suitable touch screens may include resistive, capacitive, infrared or surface acoustic wave (SAW) type touch screens. In some cases, the touch screen 54 may be either inset or recessed within a controller housing (not shown). In certain embodiments, the touch screen 54 can be provided as part of a liquid crystal display (LCD) panel, fixed segment display, cathode ray tube (CRT), dot matrix display, or any other suitable display device.

In the illustrative embodiment, the touch screen 54 may be configured to display a main menu screen 51 that provides the user with information about the operational status of the HVAC controller 62, the current inside temperature 56 (or multiple inside temperatures, with one for each of a number of zones, if provided), the current outside temperature 60, the current time and day of week 58, the current heat and/or cool set point 64, as well as other operational information. The main menu screen 51 may be the default screen that appears on the touch screen 54 when the controller is initially activated, after a loss of power has occurred, or after no activity has been detected by the user interface 50 for a certain period of time (e.g. after 1 minute of non-activity).

By pressing various icon buttons on the touch screen 54, the controller can be configured to access one or more sub-menus or screens to view and, if desired, modify various operational settings of the HVAC controller 12. For example, the user may use the touch screen 54 to adjust the current temperature or humidity setpoints, change the clock or date settings of the controller, set a vacation schedule on the controller that can be run while the user is on vacation, etc. In the illustrative embodiment, the touch screen 54 may also be used to check the status of the various system components connected to the HVAC controller.

As illustrated, the current inside temperature 56 can be displayed on the main menu screen 51. It is contemplated that the current inside temperature 56 may be displayed on only the main menu screen 51 of the controller 12, or on the main menu screen 51 and at least some of one or more sub-menus or screens of the controller, as desired. In the illustrative embodiment, the current inside temperature parameter 56 may be the temperature sensed by the HVAC controller temperature sensor, such as temperature sensor 18 of FIG. 1. However, it is contemplated that when the HVAC controller 12 is controlling the comfort level of the building or structure using the temperature sensed by a remote controller temperature sensor, such as temperature sensor 24 of FIG. 1, the temperature sensed by the remote controller temperature sensor 24 may be displayed as the current inside temperature 56 on the touch screen 54, if desired. Furthermore, while not shown in FIG. 3, it is contemplated that the HVAC controller user interface 50 may display both the temperature sensed by the HVAC controller temperature sensor 18 and the remote controller temperature sensor 24, if desired. Also, in some cases, when multiple zones are provided each with a corresponding remote temperature sensor, a current inside temperature may be displayed for each zone, if desired.

FIGS. 4A-D are a pictorial views showing an illustrative remote controller 14 user interface 70 having a temperature and temperature control indicator displayed on part of a display 72. In the illustrative embodiment, remote user interface 70 may include a display 72 configured to display information about one or more HVAC controller parameters. In some cases, remote user interface 70 may include an LCD touch screen 74 display configured to display and/or modify parameters, which may be transmitted to and/or received from the HVAC controller 12. Some examples of suitable touch screens may include resistive, capacitive, infrared or surface acoustic wave (SAW) type touch screens. In some cases, the touch screen 74 may be either inset or recessed within a controller housing (not shown). In certain embodiments, the touch screen 74 can be provided as part of a liquid crystal display (LCD) panel, fixed segment display, cathode ray tube (CRT), dot matrix display, or any other suitable display device.

In the illustrative embodiment, the touch screen 74 may be configured to have a display that provides the user with information about the operational status of the HVAC controller 12, such as, the current inside temperature 76, the current outside temperature 84, the current time 86, the current heat and/or cool set point 82, as well as other operational information as desired.

By pressing various icon buttons on the touch screen 74, the remote controller 14 can be configured to access one or more sub-menus or screens to view and, if desired, modify various operational settings of the HVAC controller 12. For example, the user may use the touch screen 74 to adjust the current temperature or humidity setpoints, change the clock or date settings of the HVAC controller 12, change the operational settings of the HVAC controller 12 (i.e. heat, cool, off), etc.

In the illustrative embodiment, the touch screen 54 may also be able to set and/or indicate which temperature sensor (e.g. temperature sensor 18 or temperature sensor 24 of FIG. 1) is being used to control the comfort level of the building or structure. As illustrated, touch screen 74 may include an icon 78 for indicating when the temperature sensor 18 of the HVAC controller 12 is controlling, and an icon 80 for indicating when the temperature sensor 24 of the remote controller 14 is controlling. To indicate which device is controlling, the icon corresponding to the controlling device may include a bold outline, as illustrated by bold outline around icon 80, or may be highlighted or indicated in any other manner, as desired. In some cases, a user may be able to touch the area of the touch screen 74 corresponding to icon 78 or 80 to manually select and switch which device is controlling the comfort level of the building.

Figure 4A:
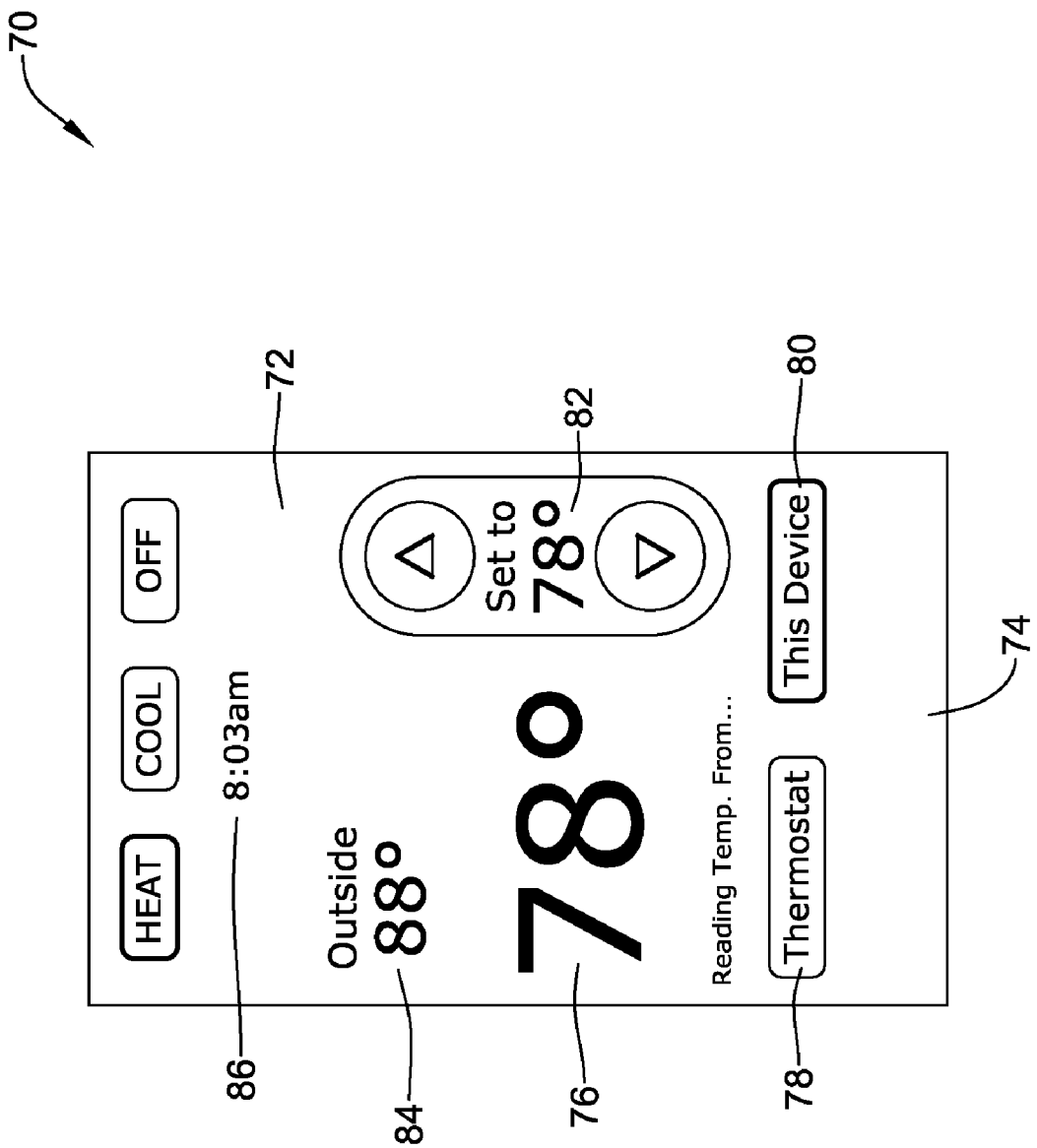

As illustrated in FIG. 4A by the bold outline around icon 80, the temperature sensor 24 of the remote controller 14 is currently being used to control the comfort level of the building or structure. When a condition, such as a predetermined condition or a combination of predetermined conditions, is detected, the temperature control may be automatically switched to use the temperature sensor of the HVAC controller 12. In one example, after a condition has been detected, and as shown in FIG. 4B, the remote user interface 74 may display a loading progress bar 88 and icon 78 indicating that control is being switched. A data exchange between the HVAC controller 12 and the remote controller 14 may take place during this time period.

In some cases, it may take a period of time for the remote controller 14 to communicate with the HVAC controller 12 and to upload and/or download updated data. The updated data can include any suitable data including updated setpoints, updated sensed temperature readings, updated sensed humidity readings, updated system status information, updated operational data and/or other data, as desired. In some cases, this may take up to 20 seconds or more. In other cases, shorter transmit times are contemplated, including nearly instantaneously.

Figure 4C:
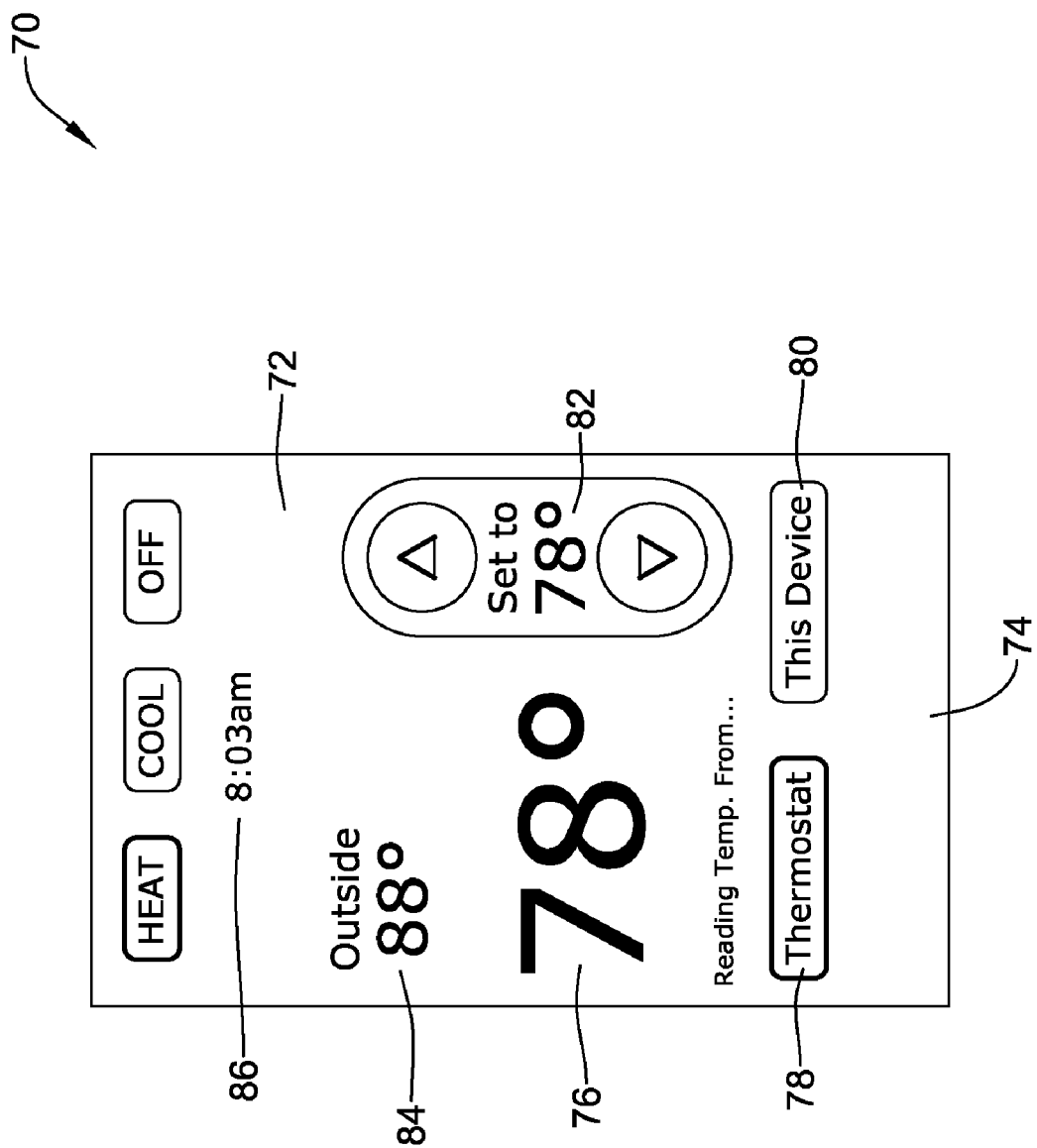

As indicated in FIG. 4C, when the remote controller 14 has uploaded the operational information from the HVAC controller 12, the remote user interface 74 may display a similar display 72 as shown in FIG. 4A, with the change of icon 78 indicating that the temperature sensor 18 of the HVAC controller 12 is now controlling instead of the remote controller temperature sensor 24. Also, and in some cases, updated setpoint, sensed temperature, sensed humidity, system status and/or other data may also be displayed.

Figure 4D:
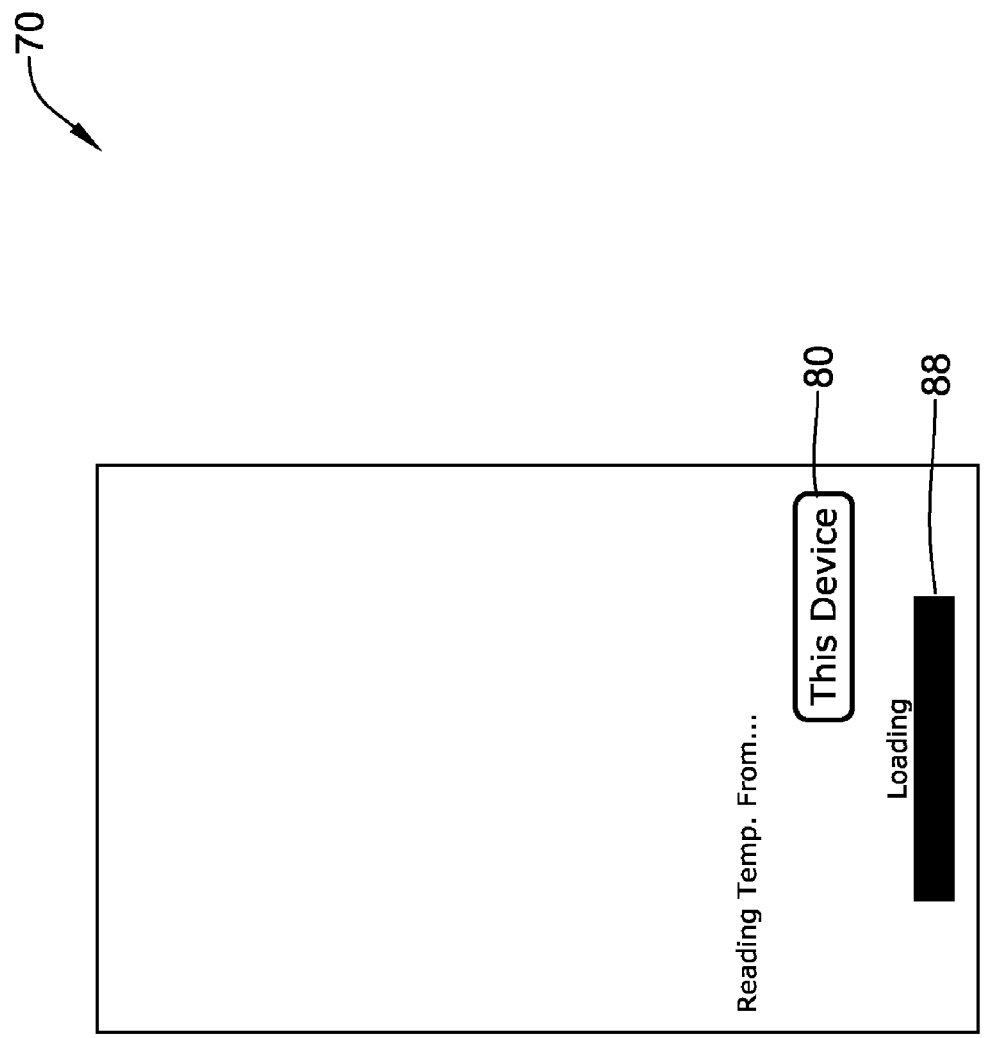

In some embodiments, when the HVAC controller 12 determines that the condition is no longer detected, and if programmed so that control should be switched back to the temperature sensor 24 of the remote controller 14 when the condition is no longer detected, control may be automatically switch back to the remote controller temperature sensor 24. When switching control back to the remote controller temperature sensor 24, as shown in FIG. 4D, a progress bar 88 and icon 80 may be displayed on the remote user interface 74 as described above.

While the illustrative temperature control indicator has been described with reference to the remote controller 14, it is contemplated that any or all of the features of the temperature control indicator may instead, or in addition, be included in the user interface 54 of the HVAC controller 12, if desired.

Figure 5:
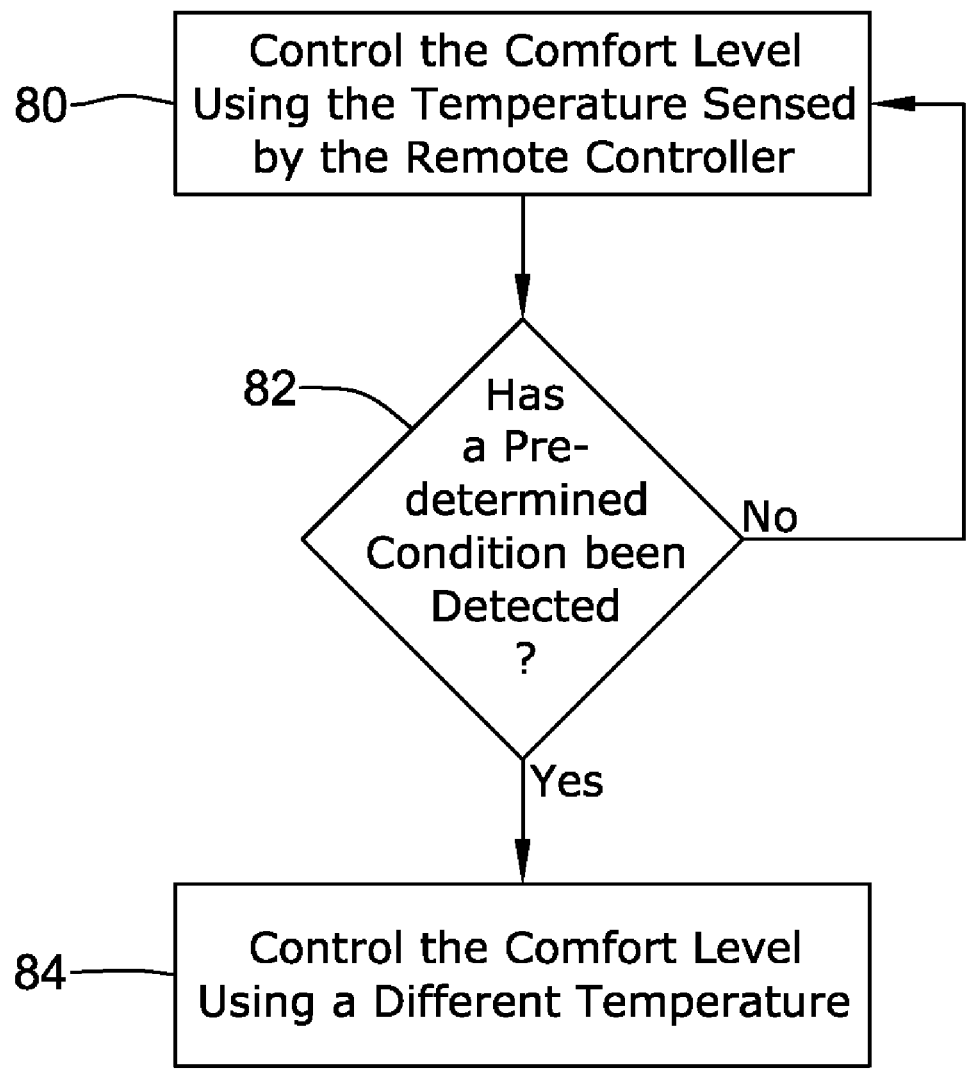

FIG. 5 is a flow diagram of an illustrative method of controlling the comfort level of a building control system. In the illustrative method, at block 80, the HVAC controller 12, or more specifically the control module 22 of the HVAC controller 12, may control the comfort level of the building or structure using the temperature sensed by the temperature sensor 24 of the remote controller 14.

Then, at block 82, the control module 22 of the HVAC controller 12 may determine if a predetermined condition (or combination of predetermined conditions) has been detected. In some cases, the predetermined condition may include, for example, but is not limited to, the first temperature sensed by temperature sensor 18 and the second temperature sensed by the temperature sensor 24 deviating by more than a threshold amount, the expiration of a period of time, the second temperature exceeding a temperature limit, a rate of change of the first temperature and a rate of change of the second temperature deviating by more than a threshold amount, a rate of change of the second temperature exceeding a threshold limit, a direction of change of the first temperature and a direction of change of the second temperature being different, a programmed schedule time boundary being passed, and/or any other suitable condition or combination of conditions, as desired.

In another example, the second temperature may have an expected response direction when one or more HVAC components are activated by the control module 22, and the condition may include a detected response direction of the second temperature that is different from the expected response direction. For example, when a furnace is activated by the control module 22, an expected response may be that the first temperature and the second temperature should increase after a period of time, and not decrease. If the second temperature decreases, a condition may be detected.

In yet another example, the first temperature and the second temperature may each have an expected response time in response to activation of one or more HVAC components by the control module 22, and the condition may include the response time of the first temperature and the response time of the second temperature deviating by more than a threshold amount. In yet another example, the control module 22 may cycle the one or more HVAC components at an expected cycle rate or range of cycle rates when controlling the comfort level of at least the portion of the building or other structure, and the condition may include a detected cycle rate of one or more HVAC components that falls outside of the expected cycle rate or range of cycle rates.

If the predetermined condition has not been detected, then, at block 80, the HVAC controller 12, or more specifically the control module 22, may continue to control the comfort level of the building or structure using the temperature sensed by the remote controller 14. However, if a predetermined condition is detected, then, at block 84, the control module 22 may automatically switch control from the temperature sensed by the temperature sensor 24 of the remote controller 14 to a different temperature. In some cases, the different temperature may be the temperature sensed by the temperature sensor 18 of the HVAC controller 12, an arithmetic combination of the temperature sensed by the temperature sensor 18 of the HVAC controller 12 and the temperature sensed by the temperature sensor 24 of the remote controller 14, an average of the temperature sensed by the temperature sensor 18 of the HVAC controller 12 and the temperature sensed by the temperature sensor 24 of the remote controller 14, a weighted average of the temperature sensed by the temperature sensor 18 of the HVAC controller 12 and the temperature sensed by the temperature sensor 24 of the remote controller 14, or any other different temperature, as desired.

In some embodiments, the control temperature used by the control module 22 may be restricted to a fixed range of values according to the temperature sensed by the HVAC controller temperature sensor 18 and/or the remote controller temperature sensor 24. For example, the control may be restricted to a range of +/−3 degrees Fahrenheit of the temperature sensed by the HVAC controller temperature sensor 18. In this case, for example, if the temperature difference between the temperature sensed by the HVAC controller temperature sensor 18 and the temperature sensed by the remote controller temperature sensor 24 is more than +/−3 degrees Fahrenheit, then the control module 22 may restrict the actual control temperature to +/−3 degrees Fahrenheit from the temperature reported by the HVAC controller temperature sensor 18. It is contemplated that such a temperature range may be any suitable temperature range, and may be user adjustable or user non-adjustable, as desired.

Figure 6:
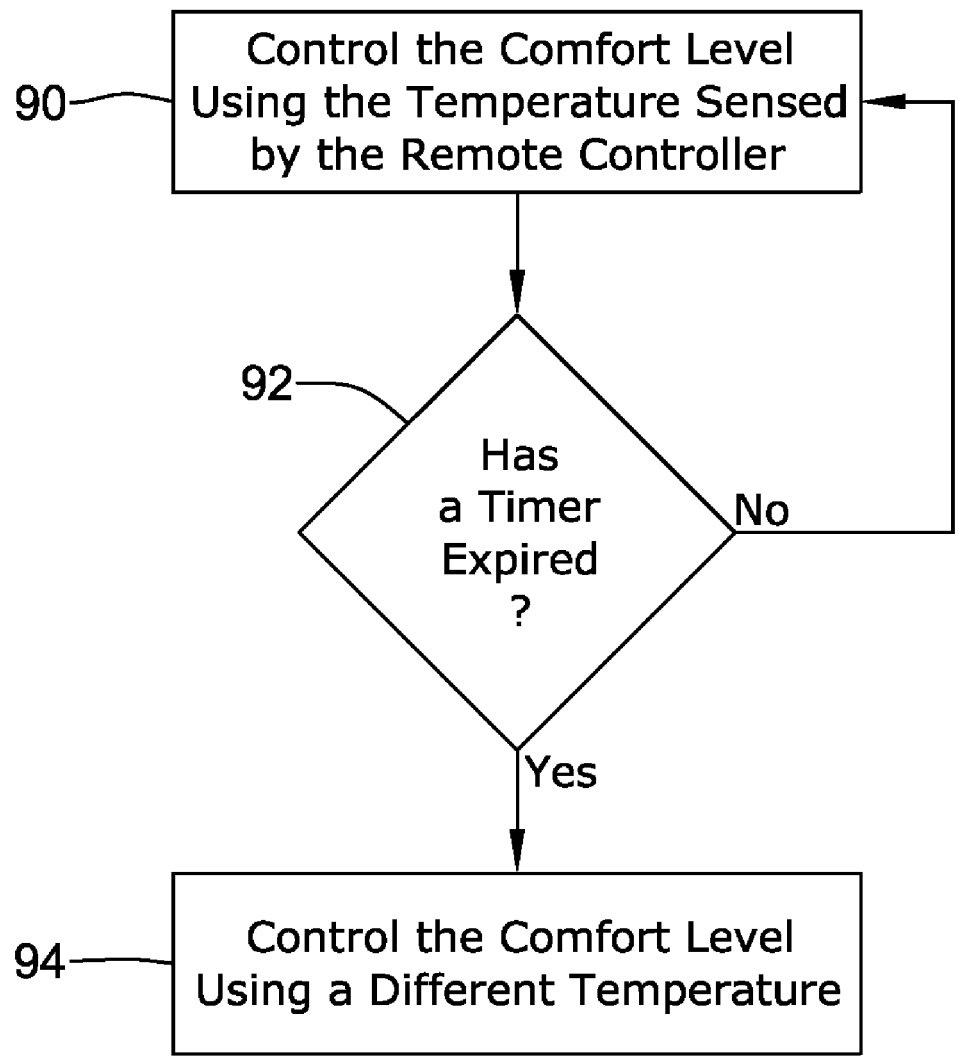

FIG. 6 is a flow diagram of another illustrative method of controlling the comfort level of a building control system. In the illustrative method, at block 90, the HVAC controller 12, or more specifically the control module 22 of the HVAC controller 12, may control the comfort level of the building or structure using the temperature sensed by the temperature sensor 24 of the remote controller 14, as shown at block 90.

Then, at block 92, the control module 22 of the HVAC controller 12 may determine if a timer, implemented in hardware and/or software, has expired. The timer may be a fixed timer having a fixed duration or may be a random timer having a random duration. In the random timer case, the timer may have fixed upper and/or lower timer limits, but this is not required. In either case, it is contemplated that the timer may or may not be user adjustable, as desired. Furthermore, in some cases, the timer may be adjustable between a fixed timer and a random timer, if desired.

If the timer has not expired, then, at block 90, the control module 22 may continue to control the comfort level of the building or structure using the temperature sensed by the remote controller 14. However, if the timer has expired, then, at block 94, the control module 22 may automatically switch control from the temperature sensed by the temperature sensor 24 of the remote controller 14 to a different temperature, as discussed previously.

Figure 7:
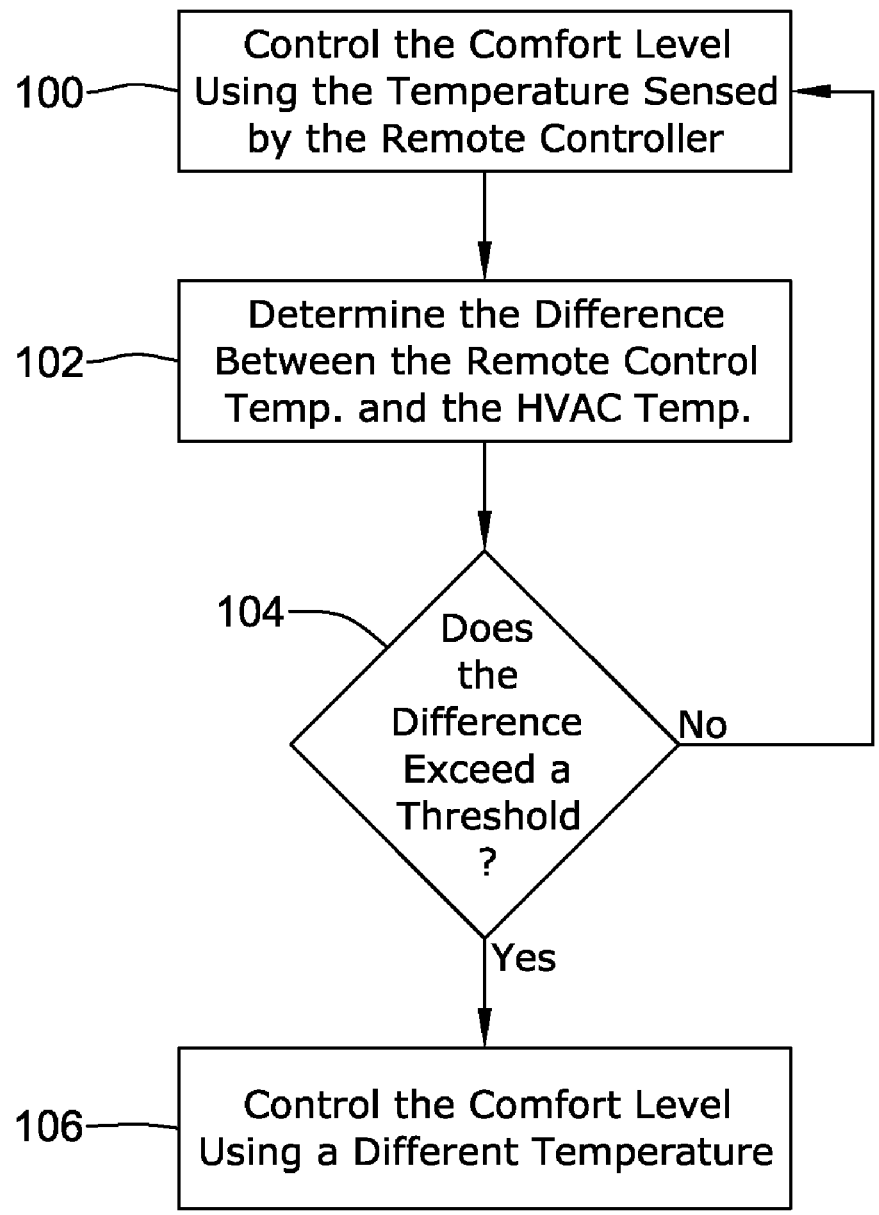

FIG. 7 is a flow diagram of another illustrative method of controlling the comfort level of a building control system. In the illustrative method, at block 100, the HVAC controller 12, or more specifically the control module 22 of the HVAC controller 12, may control the comfort level of the building or structure using the temperature sensed by the temperature sensor 24 of the remote controller 14.

At block 102, the control module 22 may determine the difference between the temperature sensed by the remote controller temperature sensor 24 and the temperature sensed by the HVAC controller temperature sensor 18. Then, at block 104, the control module may determine if the temperature difference between the temperature sensed by the remote controller temperature sensor 24 and the temperature sensed by the HVAC controller temperature sensor 18 exceeds a threshold value. The threshold value may or may not be user adjustable, as desired. In some cases, the temperature difference threshold may be +/−2 degrees Fahrenheit, +/−3 degrees Fahrenheit, +/−4 degrees Fahrenheit, +/−5 degrees Fahrenheit, +/−10 degrees Fahrenheit, or any other temperature difference, as desired.

If the temperature difference does not exceed the temperature difference threshold value, then, at block 100, the control module 22 may continue to control the comfort level of the building or structure using the temperature sensed by the remote controller 14. However, if the temperature difference exceeds the temperature difference threshold, then, at block 106, the control module 22 may automatically switch control from the temperature sensed by the temperature sensor 24 of the remote controller 14 to a different temperature, as discussed previously.

Figure 8:
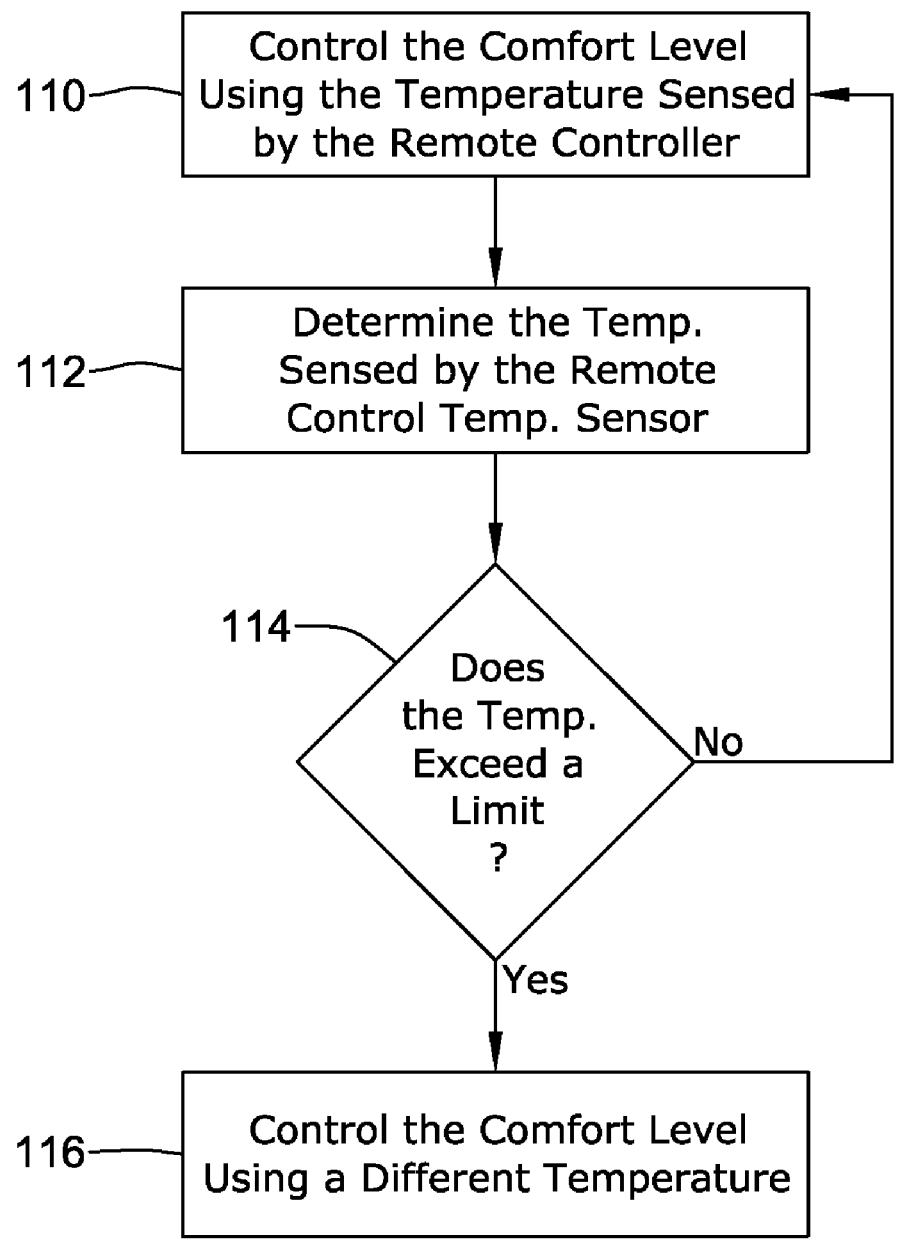

FIG. 8 is a flow diagram of another illustrative method of controlling the comfort level of a building control system. In the illustrative method, at block 110, the HVAC controller 12, or more specifically the control module 22 of the HVAC controller 12, may control the comfort level of the building or structure using the temperature sensed by the temperature sensor 24 of the remote controller 14.

At block 112, the control module 22 may determine the temperature sensed by the remote controller temperature sensor 24. Then, at block 114, the control module 22 may determine if the sensed temperature exceeds a temperature limit. The temperature limit may include a high temperature limit and/or a low temperature limit. In some cases, the temperature limit may be user adjustable, but this is not required.

If the sensed temperature does not exceed the temperature limit, then, at block 110, the control module 22 may continue to control the comfort level of the building or structure using the temperature sensed by the remote controller 14. However, if the sensed temperature does exceed the temperature limit, then, at block 116, the control module 22 may automatically switch control from the temperature sensed by the temperature sensor 24 of the remote controller 14 to a different temperature, as discussed previously.

Figure 9:
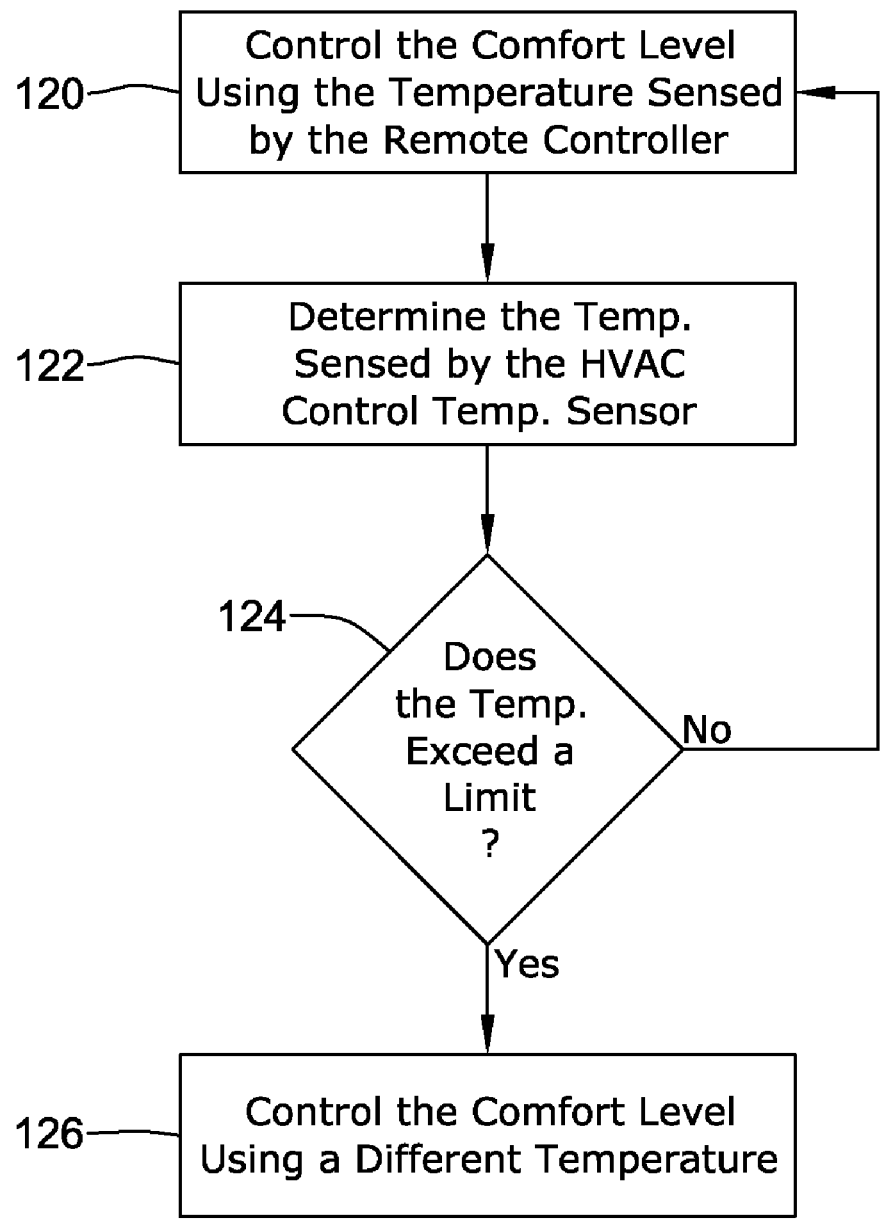

FIG. 9 is a flow diagram of another illustrative method of controlling the comfort level of a building control system. In the illustrative method, at block 120, the HVAC controller 12, or more specifically the control module 22 of the HVAC controller 12, may control the comfort level of the building or structure using the temperature sensed by the temperature sensor 24 of the remote controller 14.

At block 122, the control module 22 may determine the temperature sensed by the HVAC controller temperature sensor 18. Then, at block 124, the control module 22 may determine if the sensed temperature exceeds a temperature limit. The temperature limit may include a high temperature limit and/or a low temperature limit. In some cases, the temperature limit may be user adjustable, but this is not required.

If the sensed temperature does not exceed the temperature limit, then, at block 110, the control module 22 may continue to control the comfort level of the building or structure using the temperature sensed by the remote controller 14. However, if the sensed temperature does exceed the temperature limit, then, at block 126, the control module 22 may automatically switch control from the temperature sensor of the remote controller 14 to a different temperature, as discussed previously.

Figure 10:
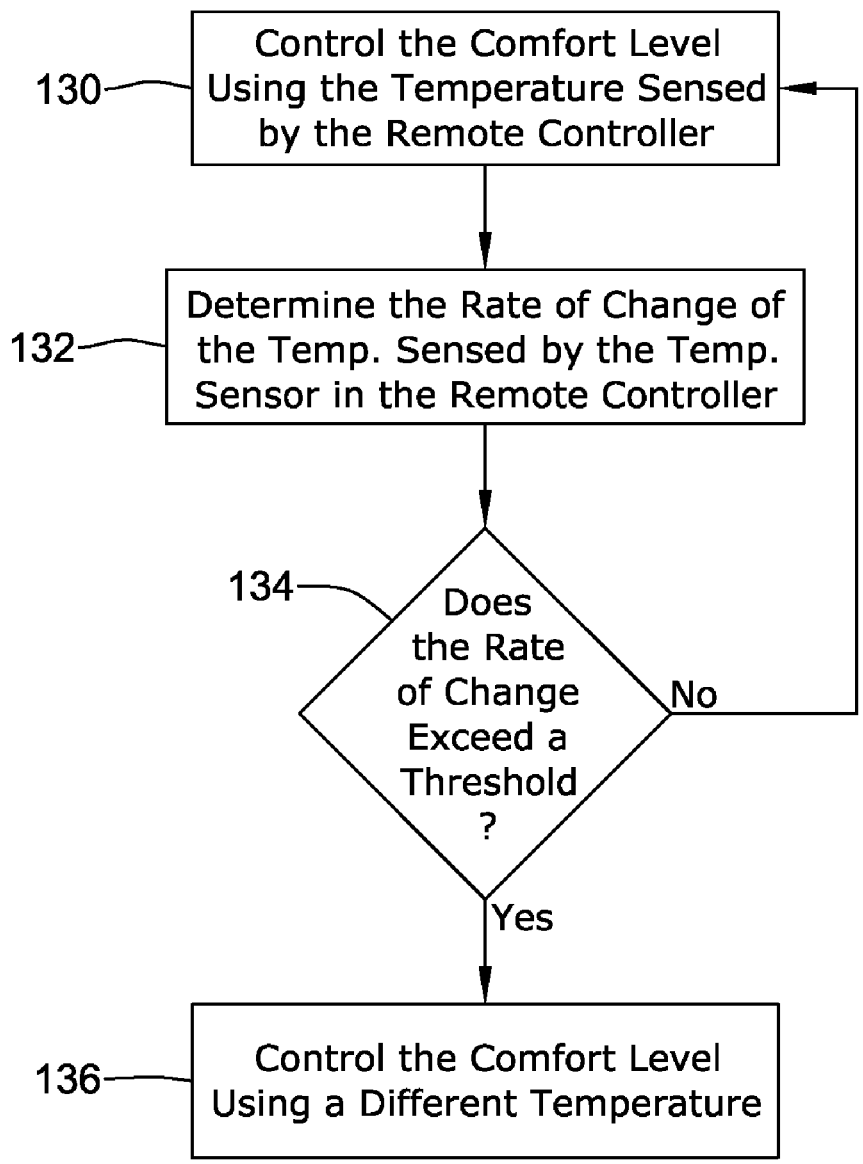

FIG. 10 is a flow diagram of another illustrative method of controlling the comfort level of a building control system. In the illustrative method, at block 130, the HVAC controller 12, or more specifically the control module 22 of the HVAC controller 12, may control the comfort level of the building or structure using the temperature sensed by the temperature sensor 24 of the remote controller 14.

At block 132, the control module 22 may determine the rate of change of the temperature sensed by the temperature sensor 24 in the remote controller 14. The rate of change may be determined by monitoring the temperature of the remote controller temperature sensor 24 over a period of time. Then, at block 134, the control module 22 may determine if the rate of change of the temperature sensed by the remote controller temperature sensor 24 exceeds a threshold. The rate of change threshold may or may not be user adjustable, as desired.

If the rate of change does not exceed the rate of change threshold, then, at block 130, the control module 22 may continue to control the comfort level of the building or structure using the temperature sensed by the remote controller 14. However, if the determined rate of change does exceed the rate of change threshold, then, at block 136, the control module 22 may automatically switch control from the temperature sensed by the temperature sensor 24 of the remote controller 14 to a different temperature, as discussed previously.

Figure 11:
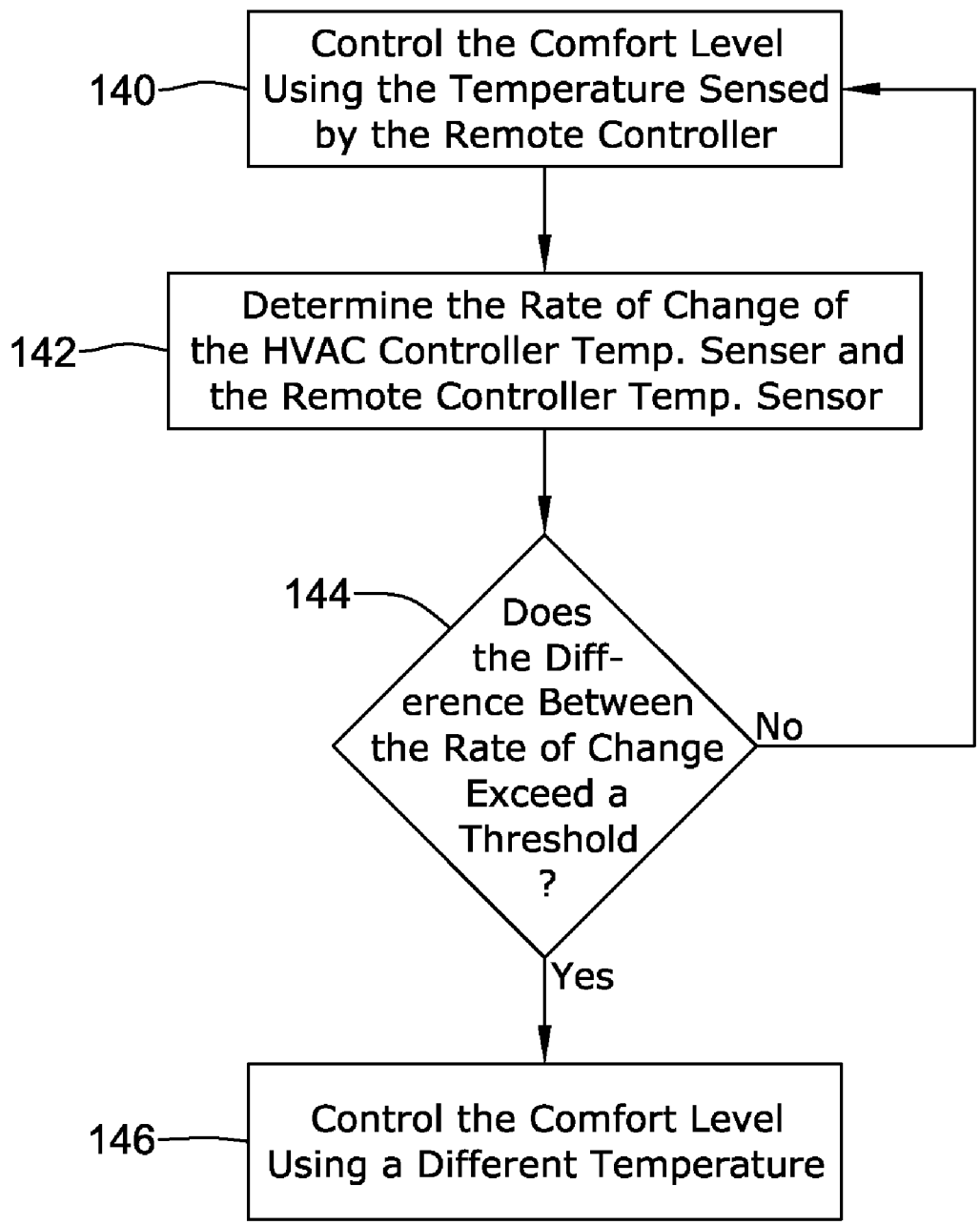

FIG. 11 is a flow diagram of another illustrative method of controlling the comfort level of a building control system. In the illustrative method, at block 40, the HVAC controller 12, or more specifically the control module 22 of the HVAC controller 12, may control the comfort level of the building or structure using the temperature sensed by the temperature sensor 24 of the remote controller 14.

At block 142, the control module 22 may determine the rate of change of the temperature sensed by the temperature sensor 24 in the remote controller 14 and the rate of change of the temperature sensed by the temperature sensor 18 in the HVAC controller 12. In some cases, the control module 22 may then determine the difference between the two rates of changes.

Then, at block 144, the control module 22 may determine if the difference in the rate of change between the temperatures sensed by the remote controller temperature sensor 24 and the HVAC controller temperature sensor 18 exceeds a rate of change difference threshold. In some cases, the rate of change difference threshold may or may not be user adjustable, as desired.

If the rate of change difference does not exceed the rate of change difference threshold, then, at block 140, the control module 22 may continue to control the comfort level of the building or structure using the temperature sensed by the remote controller 14. However, if the rate of change difference exceeds the rate of change difference threshold, then, at block 146, the control module 22 may automatically switch control from the temperature sensed by the temperature sensor 24 of the remote controller 14 to a different temperature, as discussed previously.

Figure 12:
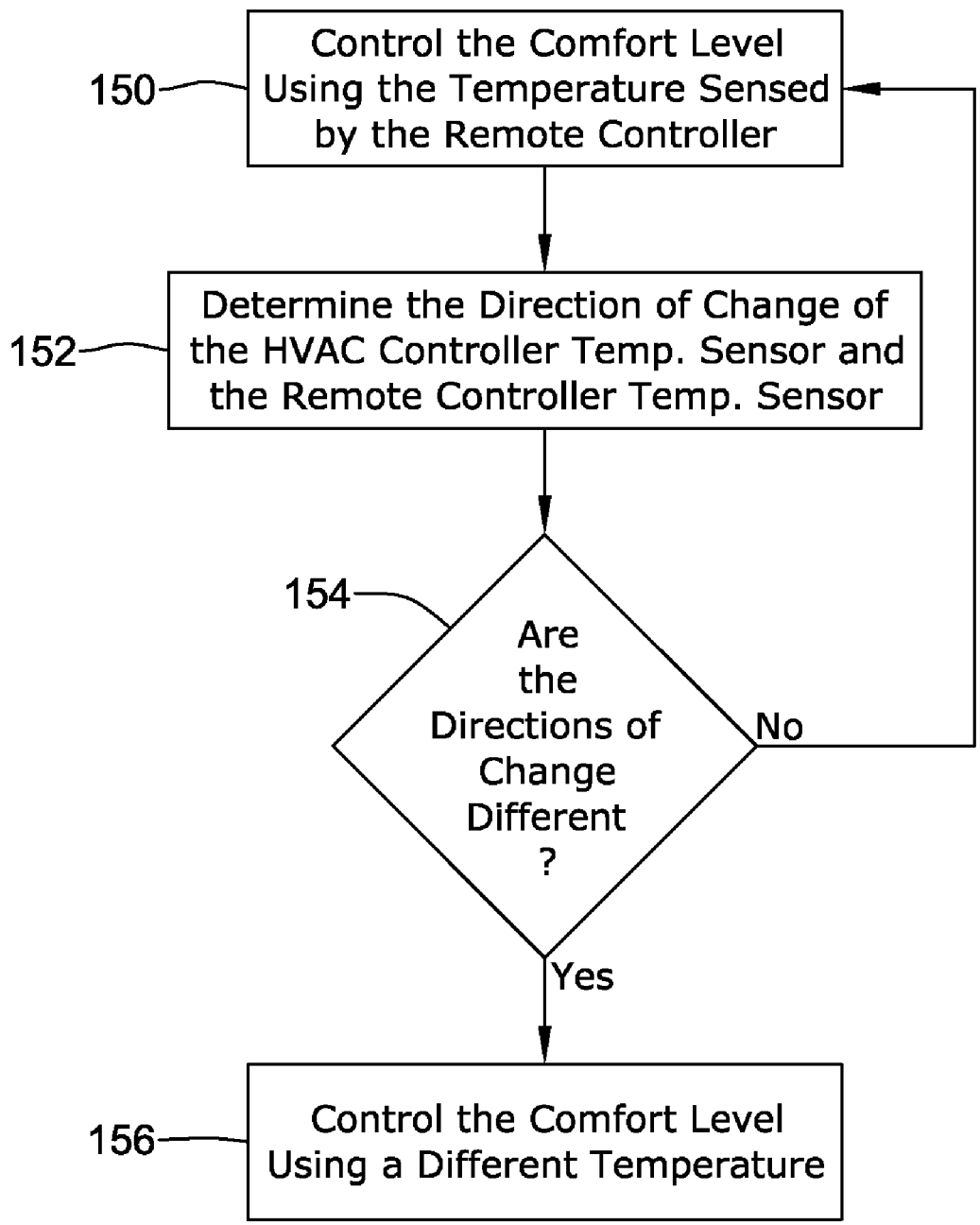

FIG. 12 is a flow diagram of another illustrative method of controlling the comfort level of a building control system. In the illustrative method, at block 150, the HVAC controller 12, or more specifically the control module 22 of the HVAC controller 12, may control the comfort level of the building or structure using the temperature sensed by the temperature sensor 24 of the remote controller 14.

At block 152, the control module 22 may determine the direction of change of the temperature sensed by the HVAC controller temperature sensor 18 and the direction of change of the temperature sensed by the remote controller temperature sensor 24. The direction of change may be determined by monitoring the temperatures sensed by the temperature sensors 18 and 24 over a period of time and determining if the sensed temperatures are increasing or decreasing. Then, at block 154, the control module 22 may determine if the directions of change of the remote controller temperature sensor 24 and the HVAC controller temperature sensor 18 are in the same direction (i.e. both increasing or both decreasing).

If the directions of change are both in the same direction, then, at block 150, the control module 22 may continue to control the comfort level of the building or structure using the temperature sensed by the remote controller 14. However, if the directions of change are not in the same direction, then, at block 156, the control module 22 may automatically switch control from the temperature sensed by the temperature sensor 24 of the remote controller 14 to a different temperature, as discussed previously.

Figure 13:
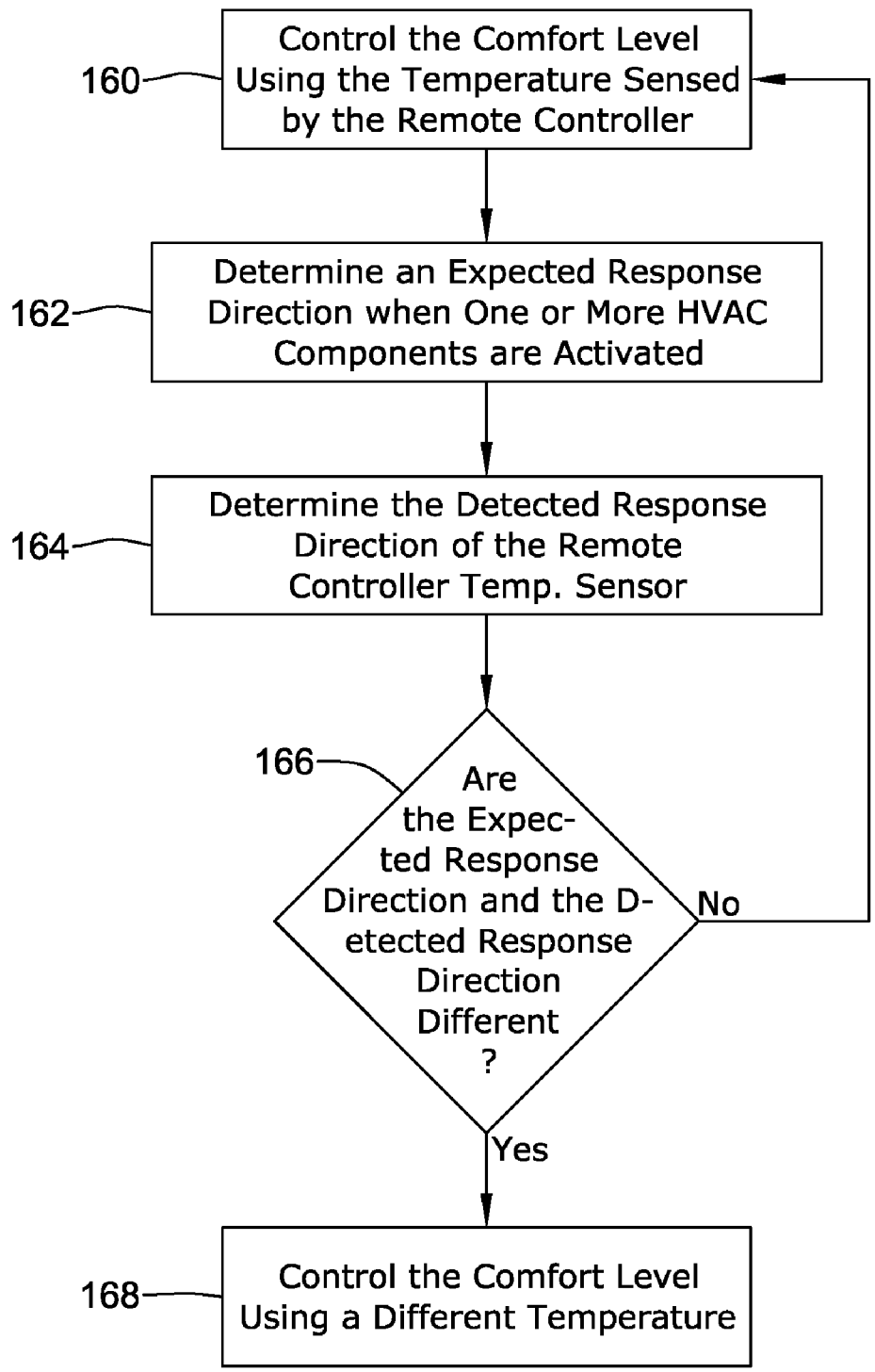

FIG. 13 is a flow diagram of another illustrative method of controlling the comfort level of a building control system. In the illustrative method, at block 160, the HVAC controller 12, or more specifically the control module 22 of the HVAC controller 12, may control the comfort level of the building or structure using the temperature sensed by the temperature sensor 24 of the remote controller 14.

At block 162, the control module 22 may determine an expected response direction of the remote controller temperature sensor 18 when one or more HVAC components are activated. For example, when one or more HVAC heating components are activated, the expected response direction of the remote controller temperature sensor 24 may be an increase in temperature due to the increase heat provided by the HVAC system. Similarly, when one or more HVAC cooling components are activated, the expected response direction of the remote controller temperature sensor 24 may be a decrease in temperature due to the increased cooling provided by the HVAC system.

Then, at block 164, the control module 22 may detect the response direction of the remote controller temperature sensor 24. Next, at block 166, the control module 22 may determine if the expected response direction and the detected response direction are difference directions.

If the expected response direction and the detected response direction are the same direction, then, at block 160, the control module 22 may continue to control the comfort level of the building or structure using the temperature sensed by the remote controller 14. However, if the expected response direction and the detected response direction are difference directions, then, at block 168, the control module 22 may automatically switch control from the temperature sensed by the temperature sensor 24 of the remote controller 14 to a different temperature, as discussed previously.

Figure 14:
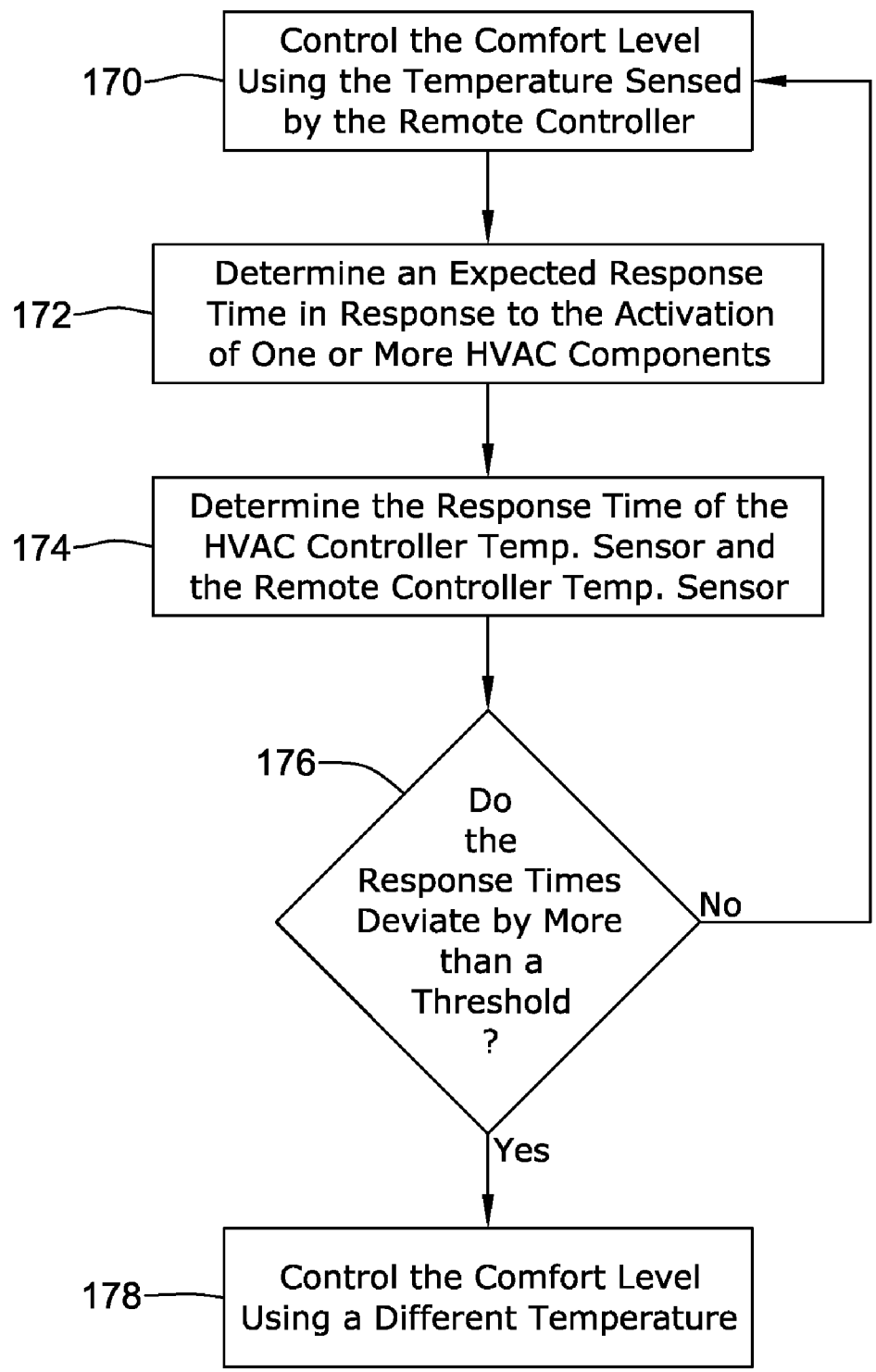

FIG. 14 is a flow diagram of another illustrative method of controlling the comfort level of a building control system. In the illustrative method, at block 170, the HVAC controller 12, or more specifically the control module 22 of the HVAC controller 12, may control the comfort level of the building or structure using the temperature sensed by the temperature sensor 24 of the remote controller 14.

At block 172, the control module 22 may determine an expected response time in response to the activation of one or more HVAC components (e.g. heating and/or cooling). Then, at block 174, the control module 22 may determine the response time of the HVAC controller temperature sensor 18 and the remote controller temperature sensor 24. For example, if the remote controller is stuck between the cushions of a couch or is placed next to an open window, the response time of the remote controller temperature sensor 24 of the remote controller 14 may be much longer than the response time of the HVAC controller temperature sensor 18 of the HVAC controller 12.

In some cases, if the remote controller fails to respond entirely, it may be determined that the remote controller 14 may be out of wireless range of the HVAC controller 12, out of batteries, or otherwise have failed.

Next, at block 176, the control module may determine if the response times deviate by more than a threshold time. In some cases, the response threshold time may or may not be user adjustable.

If the response times do not deviate by more than the response time threshold, then, at block 170, the control module 22 may continue to control the comfort level of the building or structure using the temperature sensed by the remote controller 14. However, if the response times deviate by more than the response time threshold, then, at block 178, the control module 22 may automatically switch control from the temperature sensed by the temperature sensor 24 of the remote controller 14 to a different temperature, as discussed previously.

Figure 15:
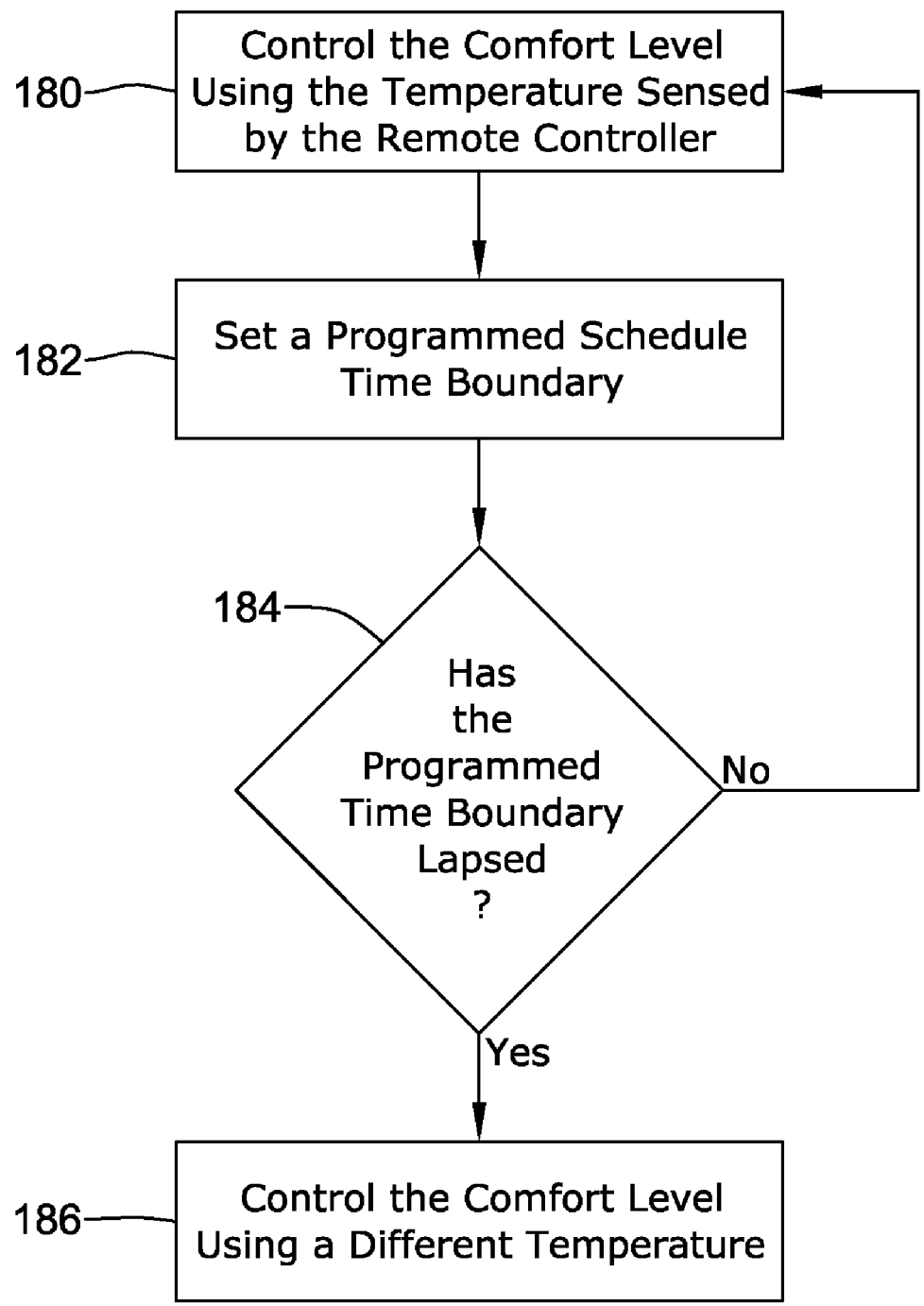

FIG. 15 is a flow diagram of another illustrative method of controlling the comfort level of a building control system. In the illustrative method, at block 180, the HVAC controller 12, or more specifically the control module 22 of the HVAC controller 12, may control the comfort level of the building or structure using the temperature sensed by the temperature sensor 24 of the remote controller 14.

At block 182, the control module 22 may include a programmed schedule time boundary. In some cases, this may be user programmable, but this is not required. For example, the control module 22 may have sleep, wake, away and return schedule periods as is common in some thermostats, with a schedule time boundary between each period. Then, at block 184, the control module 22 may determine if a programmed time boundary, and in cases, a particular program time boundary, has lapsed or passed.

If the programmed time boundary has not lapsed or passed, then, at block 180, the control module 22 may continue to control the comfort level of the building or structure using the temperature sensed by the remote controller 14. However, if the programmed time boundary has lapsed or passed, then, at block 186, the control module 22 may automatically switch control from the temperature sensed by the temperature sensor 24 of the remote controller 14 to a different temperature, as discussed previously.

Figure 16:
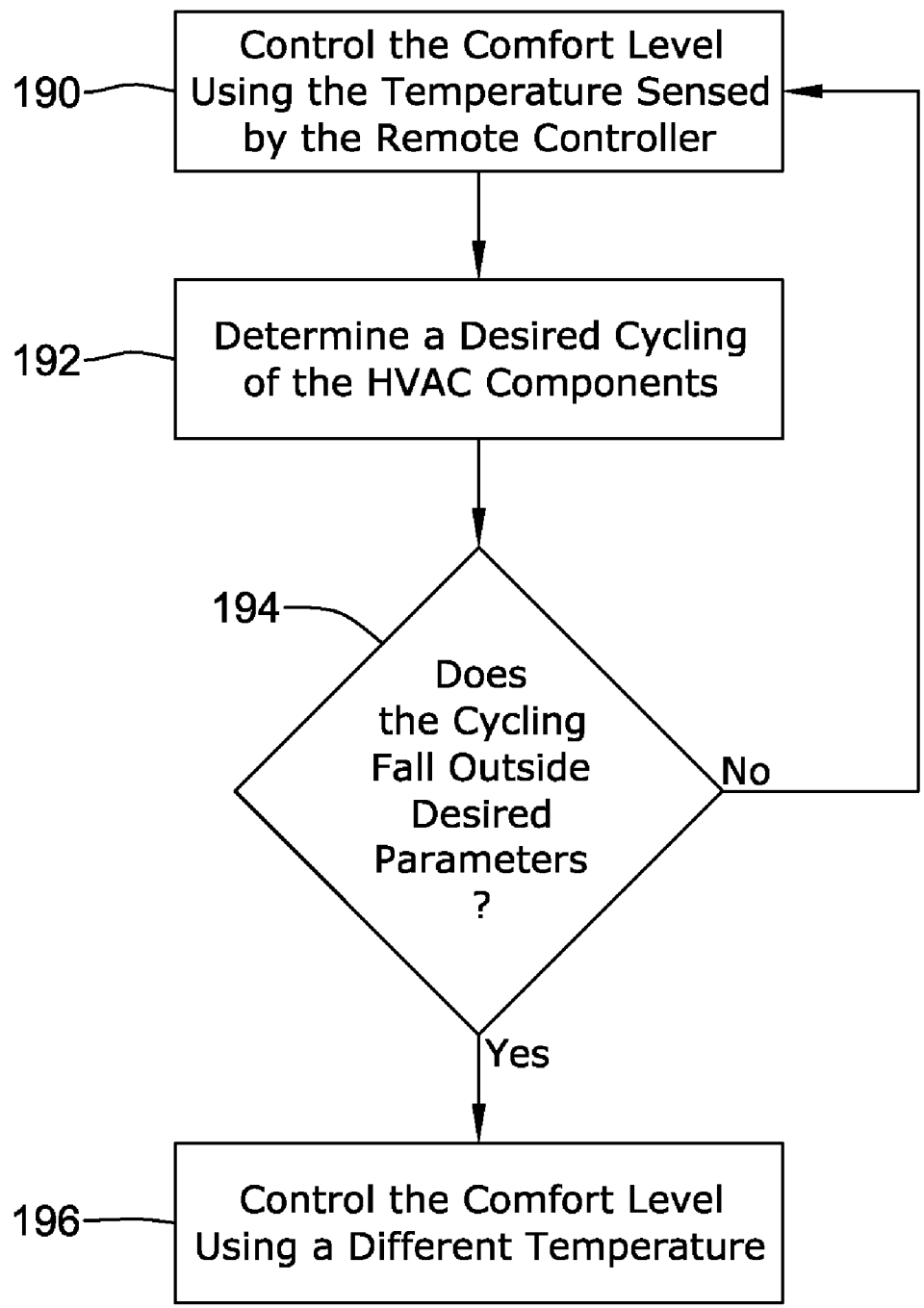

FIG. 16 is a flow diagram of another illustrative method of controlling the comfort level of a building control system. In the illustrative method, at block 190, the HVAC controller 12, or more specifically the control module 22 of the HVAC controller 12, may control the comfort level of the building or structure using the temperature sensed by the temperature sensor 24 of the remote controller 14.

At block 192, the control module 22 may determine a desired or expected cycling rate or range of desired or expected cycling rates of one or more HVAC components. Then, at block 194, the control module 22 may determine if the actual cycling rate falls outside the desired or expected cycling rate or range of cycle rates. In some cases, the desired or expected cycling rates or range of cycling rates may be based, at least in part, on the outdoor temperature and in some cases the current temperature setpoint. For example, if the outdoor temperature is very cold, the cycling rate may be expected to be higher than if the outdoor temperature is relatively warmer. In some cases, the desired or expected cycling rate or range of cycle rates may be determined from a cycling rate history of the HVAC controller 12.

If the current cycling rate does not fall outside the desired or expected cycling rate or range of cycle rates, then, at block 190, the control module 22 may continue to control the comfort level of the building or structure using the temperature sensed by the remote controller 14. However, if current cycling rate does fall outside the desired or expected cycling rate or range of cycle rates, then, at block 196, the control module 22 may automatically switch control from the temperature sensed by the temperature sensor 24 of the remote controller 14 to a different temperature, as discussed previously.

Figure 17:
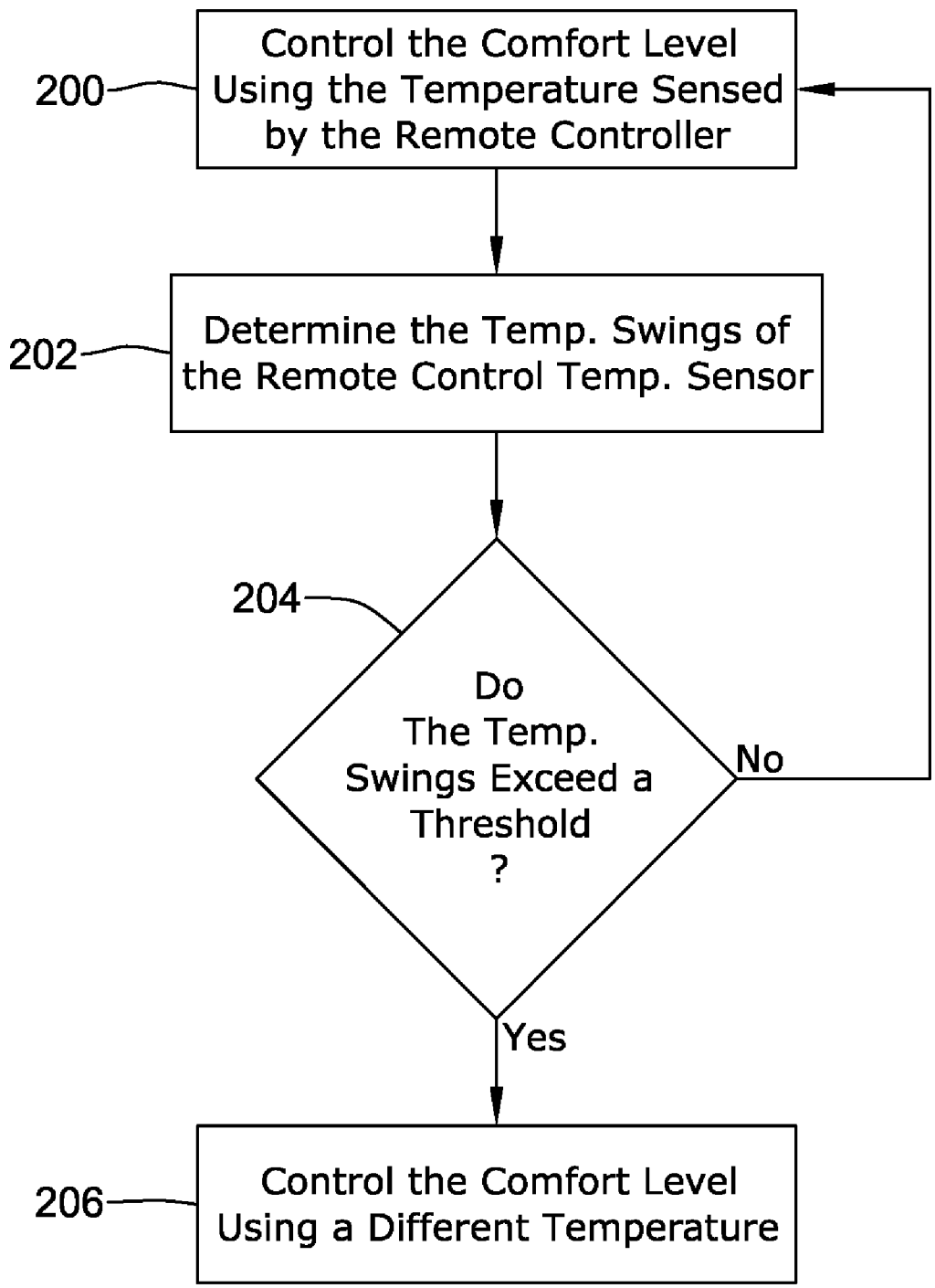

FIG. 17 is a flow diagram of another illustrative method of controlling the comfort level of a building control system. In the illustrative method, at block 200, the HVAC controller 12, or more specifically the control module 22 of the HVAC controller 12, may control the comfort level of the building or structure using the temperature sensed by the temperature sensor 24 of the remote controller 14.

At block 202, the control module 22 may determine the temperature swings detected by the remote controller temperature sensor 24 over time. Then, at block 204, the control module 22 may determine if the temperature swings detected by the remote controller temperature sensor 24 exceed a temperature swing threshold. In some cases, the temperature swing threshold may be any suitable value, such as +/−3 degrees Fahrenheit or +/−5 degrees Fahrenheit, as desired. In other cases, the temperature swing threshold may be based, in part, on the outdoor temperature.

If the temperature swings detected by the remote controller temperature sensor 24 do not exceed the temperature swings threshold, then, at block 200, the control module 22 may continue to control the comfort level of the building or structure using the temperature sensed by the remote controller 14. However, if the temperature swings of the remote controller temperature sensor 24 exceed the temperature swings threshold, then, at block 206, the control module 22 may automatically switch control from the temperature sensed by the temperature sensor 24 of the remote controller 14 to a different temperature, as discussed previously.

In any of the foregoing examples, and in some cases, the values of the above limits or thresholds may be adjustable and/or changed based on heat or cooling modes of the HVAC controller. Also, in some cases, if the condition is detected as the remote controller temperature sensor initiates control, the limit or threshold may be adjusted and then subsequently restricted to the previous limit or threshold, or the control module 22 may not automatically switch until after at least a time delay passes. Also, it is contemplated that the various methods shown in FIGS. 5-17 may be used in conjunction with one another, and in various combinations and/or permutations.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A comfort control system for controlling one or more HVAC components of a building or other structure, the comfort control system comprising:

a first controller having access to a first temperature sensor for sensing a first temperature, a wireless interface, and a control module for controlling the comfort level of at least a portion of the building or other structure in accordance with a temperature set point by activating and deactivating the one or more HVAC components of the building or other structure so that a sensed temperature approaches the temperature set point;

a second controller having a second temperature sensor for sensing a second temperature, and a wireless interface, the wireless interface of the second controller and the wireless interface of the first controller providing a communication path whereby the second temperature can be communicated from the second controller to the first controller;

the control module of the first controller controlling the comfort level of at least the portion of the building or other structure in accordance with the temperature set point by using a selected one of the first temperature or the second temperature as the sensed temperature; and wherein, when the control module of the first controller is controlling the comfort level of at least the portion of a building or other structure using the second temperature as the sensed temperature, the control module automatically switches to controlling the comfort level using the first temperature as the sensed temperature when a predetermined temperature condition is detected.

2. The comfort control system of claim 1 wherein the first controller is a wall mountable thermostat.

3. The comfort control system of claim 2 wherein the second controller is a portable remote control unit for remotely controlling the first controller.

4. The comfort control system of claim 1 wherein the predetermined temperature condition includes the first temperature and the second temperature deviating by more than a threshold amount.

5. The comfort control system of claim 1 wherein the predetermined temperature condition includes the first temperature exceeding a temperature limit.

6. The comfort control system of claim 1 wherein the predetermined temperature condition includes a rate of change of the first temperature and a rate of change of the second temperature deviating by more than a threshold amount.

7. The comfort control system of claim 1 wherein the predetermined temperature condition includes a rate of change of the second temperature exceeding a threshold limit.

8. The comfort control system of claim 1 wherein the predetermined temperature condition includes a direction of change of the first temperature and a direction of change of the second temperature being different.

9. The comfort control system of claim 1 wherein the second temperature has an expected response direction when one or more HVAC components are activated by the control module, and the predetermined temperature condition includes a detected response direction of the second temperature that is different from the expected response direction.

10. The comfort control system of claim 1 wherein the first temperature and the second temperature each have a response time in response to activation of one or more HVAC components by the control module, and the predetermined temperature condition includes the response time of the first temperature and the response time of the second temperature deviating by more than a threshold amount.

11. The comfort control system of claim 1 wherein the predetermined temperature condition includes the second temperature having at least one temperature swing that exceed a predefined limit.

12. The comfort control system of claim 1 wherein the control module of the first controller cycles the one or more HVAC components at a cycling rate when controlling the comfort level of at least the portion of the building or other structure, and wherein the predetermined temperature condition includes a cycling rate of the one or more HVAC components that deviates from an expected cycling rate by a threshold amount.

13. A building system controller comprising:
a thermostat having access to a first temperature sensor for sensing a first temperature;
a portable remote controller for remotely controlling the thermostat, the portable remote controller having a second temperature sensor for sensing a second temperature;
a wireless interface adapted to communicate the second temperature from the portable remote controller to the thermostat; and
the thermostat having a control module that controls the comfort level of at least a portion of a building by activating and/or deactivating one or more HVAC components so that a sensed temperature approaches a temperature set point, wherein when desired, the control module controls the comfort level using the second temperature as the sensed temperature, and if a predetermined condition is subsequently detected, the control module controls the comfort level using a temperature different from the second temperature as the sensed temperature.

14. The building system controller of claim 13 wherein the different temperature is the first temperature.

15. The building system controller of claim 13 wherein the different temperature is an arithmetic combination of the first temperature and the second temperature.

16. The building system controller of claim 15 wherein the different temperature is an average of the first temperature and the second temperature.

17. The building system controller of claim 16 wherein the different temperature is a weighted average of the first temperature and the second temperature.

18. A method for controlling the comfort level in at least a portion of a building using a thermostat having access to a first temperature sensor for sensing a first temperature, and a remote controller for remotely controlling the thermostat having a second temperature sensor for sensing a second temperature, the method comprising:
controlling the comfort level in at least the portion of the building so that a sensed temperature approaches a temperature set point, wherein the sensed temperature is the second temperature;
determining if one or more predetermined temperature conditions exist; and
if one or more of the predetermined temperature conditions is determined to exist, controlling the comfort level in at least the portion of the building using a different temperature than the second temperature as the sensed temperature.

19. The method of claim 18 wherein the different temperature is the first temperature.

20. The method of claim 18 wherein the different temperature is an arithmetic combination of the first temperature and the second temperature.

21. The method of claim 20 wherein the different temperature is an average of the first temperature and the second temperature.

22. The method of claim 21 wherein the different temperature is a weighted average of the first temperature and the second temperature.

23. The method of claim 18 further comprising the step of receiving the second temperature at the thermostat from the remote controller via a wireless communication link.

24. The method of claim 18 wherein the one or more predetermined temperature conditions include one or more of: a difference between the first and second temperatures exceeding a threshold, the first temperature exceeding a threshold limit; the second temperature exceeding a threshold rate of change; a programmed schedule time boundary being a passed, and a direction of change of the second temperature sensor being different from an expected direction of change.

* * * * *